(12) United States Patent
Van Gerwen et al.

(10) Patent No.: US 9,380,790 B2
(45) Date of Patent: Jul. 5, 2016

(54) 3D-FOOD PRODUCT FORMING APPARATUS AND PROCESS

(75) Inventors: Hendrikus Petrus Gerardus Van Gerwen, Someren (NL); George Lambertus Josephus Maria Boogers, Uden (NL); Hendrik Jan Righolt, Oosterhout (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 143 days.

(21) Appl. No.: 13/641,249

(22) PCT Filed: Apr. 26, 2011

(86) PCT No.: PCT/EP2011/002075
§ 371 (c)(1),
(2), (4) Date: Oct. 15, 2012

(87) PCT Pub. No.: WO2011/131372
PCT Pub. Date: Oct. 27, 2011

(65) Prior Publication Data
US 2013/0045294 A1 Feb. 21, 2013

(30) Foreign Application Priority Data

| Apr. 23, 2010 | (EP) | 10004318 |
| Aug. 19, 2010 | (EP) | 10008660 |
| Aug. 31, 2010 | (EP) | 10009039 |
| Sep. 23, 2010 | (EP) | 10010255 |
| Oct. 4, 2010 | (EP) | 10013264 |

(51) Int. Cl.
*A22C 17/00* (2006.01)
*A22C 7/00* (2006.01)
(Continued)

(52) U.S. Cl.
CPC .............. *A22C 7/0069* (2013.01); *A21C 11/02* (2013.01); *A21C 11/008* (2013.01); *A21C 11/04* (2013.01); *A21C 11/08* (2013.01); *A22C 7/0076* (2013.01)

(58) Field of Classification Search
CPC .... A22C 7/0069; A22C 7/0076; A21C 11/04; A21C 11/08; A21C 11/008; A21C 11/02
USPC ........... 425/121, 126.1, 126.2, 238, 241, 363, 425/374, 437, 556, 572, 574, 576, 425/DIG. 219; 426/513
See application file for complete search history.

(56) References Cited

U.S. PATENT DOCUMENTS 1,566,771 A * 12/1925 Perky ............................ 425/363
1,756,375 A *  4/1930 Million ...................... 425/126.2
(Continued)

FOREIGN PATENT DOCUMENTS

EP     0818148 A1    1/1998
EP     1676490 A1    7/2006
(Continued)

OTHER PUBLICATIONS

Potentially Related U.S. Appl. No. 13/001,672, filed Mar. 11, 2011, published as 2011/0151082, publication date Jun. 23, 2011.
(Continued)

*Primary Examiner* — Seyed Masoud Malekzadeh
(74) *Attorney, Agent, or Firm* — The Dobrusin Law Firm, P.C.

(57) ABSTRACT

The present invention is related to a food forming apparatus to produce patties with a form member which comprises molds in which the patties are formed, whereas the form member is located adjacent to a pressure member and is at least partially made from a porous material.

20 Claims, 23 Drawing Sheets

(51) Int. Cl.
*A21C 11/02* (2006.01)
*A21C 11/04* (2006.01)
*A21C 11/00* (2006.01)
*A21C 11/08* (2006.01)

(56) References Cited

U.S. PATENT DOCUMENTS

| | | | |
|---|---|---|---|
| 1,882,160 A * | 10/1932 | Paris | 425/235 |
| 2,192,897 A * | 3/1940 | Davis et al. | 425/510 |
| 2,651,808 A | 9/1953 | Burnett et al. | |
| 2,763,026 A | 9/1956 | Holly | |
| 2,812,729 A | 11/1957 | Werner | |
| 2,837,043 A * | 6/1958 | Grice et al. | 425/218 |
| 3,024,112 A * | 3/1962 | Burgess | 426/497 |
| 3,099,037 A * | 7/1963 | Blake et al. | 425/114 |
| 3,177,524 A | 4/1965 | Gause | |
| 3,213,486 A * | 10/1965 | Blake | 425/562 |
| 3,221,673 A | 12/1965 | Shelly | |
| 3,234,585 A * | 2/1966 | Snyder | 425/114 |
| 3,271,813 A * | 9/1966 | Gernandt et al. | 425/114 |
| 3,550,188 A | 12/1970 | Howard, Jr. et al. | |
| 3,724,026 A * | 4/1973 | Gernandt | 425/117 |
| 3,730,661 A * | 5/1973 | Tremblay | 425/126.2 |
| 3,750,232 A | 8/1973 | Holly | |
| 3,829,262 A * | 8/1974 | Aquarius | 425/126.2 |
| 3,998,574 A * | 12/1976 | Blake | 425/137 |
| 4,130,936 A * | 12/1978 | Cottrell | 29/809 |
| 4,138,050 A | 2/1979 | McKinney et al. | |
| 4,159,612 A * | 7/1979 | Johnson et al. | 53/594 |
| 4,168,139 A * | 9/1979 | Derckx | 425/126.2 |
| 4,212,609 A * | 7/1980 | Fay | 425/100 |
| 4,340,343 A | 7/1982 | Mancini | |
| 4,418,446 A * | 12/1983 | Sandberg et al. | 425/574 |
| 4,648,829 A * | 3/1987 | Cattani | 425/326.1 |
| 4,717,573 A * | 1/1988 | Aquarius | 426/274 |
| 4,872,241 A | 10/1989 | Lindee | |
| 4,886,441 A | 12/1989 | Lortz | |
| 4,957,425 A | 9/1990 | Fay | |
| 4,987,643 A * | 1/1991 | Powers et al. | 425/139 |
| 5,340,599 A | 8/1994 | Maruyama et al. | |
| 6,368,092 B1 | 4/2002 | Lindee | |
| 6,412,397 B1 * | 7/2002 | McNeel et al. | 99/330 |
| 7,976,303 B2 * | 7/2011 | van der Eerden et al. | 425/241 |
| 8,025,008 B2 * | 9/2011 | Walser | 99/419 |
| 8,152,506 B1 * | 4/2012 | Khoshaba | 425/113 |
| 8,434,404 B1 * | 5/2013 | Herrera | 99/330 |
| 8,741,367 B2 * | 6/2014 | Van Gerwen et al. | 426/389 |
| 2005/0013895 A1 | 1/2005 | Azzar | |
| 2005/0042321 A1 | 2/2005 | LaBruno | |
| 2005/0214399 A1 | 9/2005 | LaBruno et al. | |
| 2005/0220932 A1 * | 10/2005 | van der Eerden et al. | 426/1 |
| 2011/0151082 A1 | 6/2011 | Van Gerwen et al. | |
| 2012/0058213 A1 * | 3/2012 | Lindee et al. | 425/135 |
| 2013/0045294 A1 | 2/2013 | Van Gerwen et al. | |

FOREIGN PATENT DOCUMENTS

| | | |
|---|---|---|
| EP | 2064956 A1 | 6/2011 |
| FR | 2387609 A | 11/1978 |
| GB | 2312641 A | 11/1997 |
| JP | H1058463 A | 7/1996 |
| JP | 2005/530514 A | 10/2005 |
| JP | 3814605 B2 | 8/2006 |
| WO | 00/30458 A1 | 6/2000 |
| WO | 2004/002229 A | 1/2004 |
| WO | 2005/009696 A1 | 2/2005 |
| WO | 2005/107481 A2 | 11/2005 |
| WO | 2006/020139 A1 | 2/2006 |
| WO | 2011/131372 A2 | 10/2011 |
| WO | 2012/055454 A2 | 5/2012 |

OTHER PUBLICATIONS

Potentially Related U.S. Appl. No. 13/819,071, filed Feb. 26, 2013, published as WO2012/055454, publication date May 3, 2012.
International Search Report, Application No. PCT/EP2011/002075, mailed Feb. 21, 2012.
International Preliminary Report on Patentability, Application No. PCT/EP2011/002075 dated Oct. 26, 2012.
Written Opinion of the International Searching Authority, Application No. PCT/EP2011/002075 dated Oct. 23, 2012.
European Search Report, Application No. 10009039, dated Mar. 20, 2011.
Notice of Opposition to a European Patent for Patent No. EP2560495 based on European Patent Application 11720984 dated Jun. 6, 2015.
Japanese Office Action dispatched on Jan. 27, 2015 for 3D-Food Product and Forming Apparatus and Process. Japanese Patent Application No. 2013-505368.
Japanese Office Action dispatched on Oct. 30, 2015 for Japanese Patent Application No. 2013-505368.
De Ingenieur, Published Article Kleien met Kip, dated Dec. 1, 2006.
SF Engineering, Published Article "Stork: Revoportioner" dated Apr. 2009.
Statement dated Apr. 22, 2016 Concerning Opposition of European Patent No. 11720987.1.

\* cited by examiner

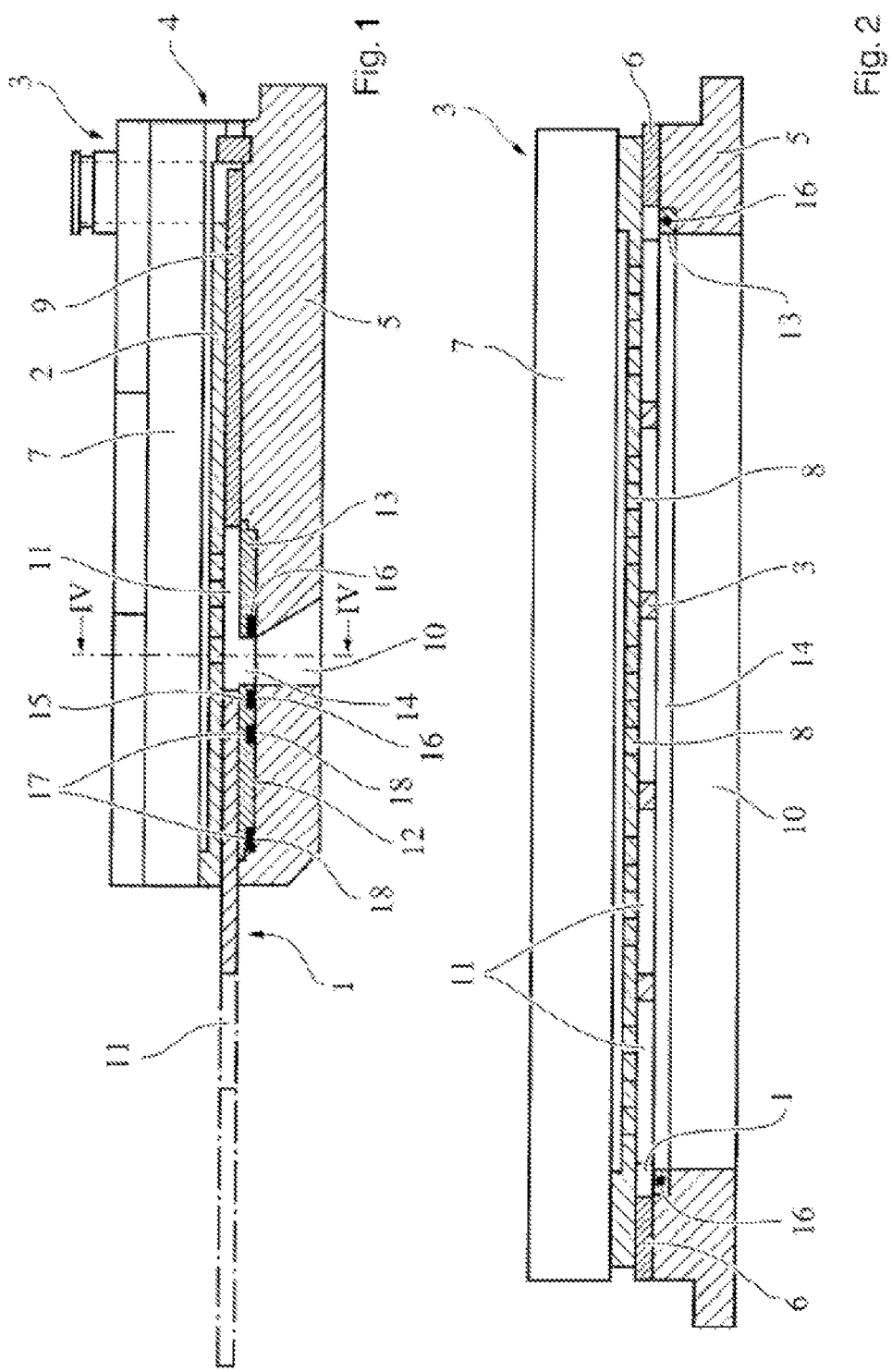

Fig. 8)

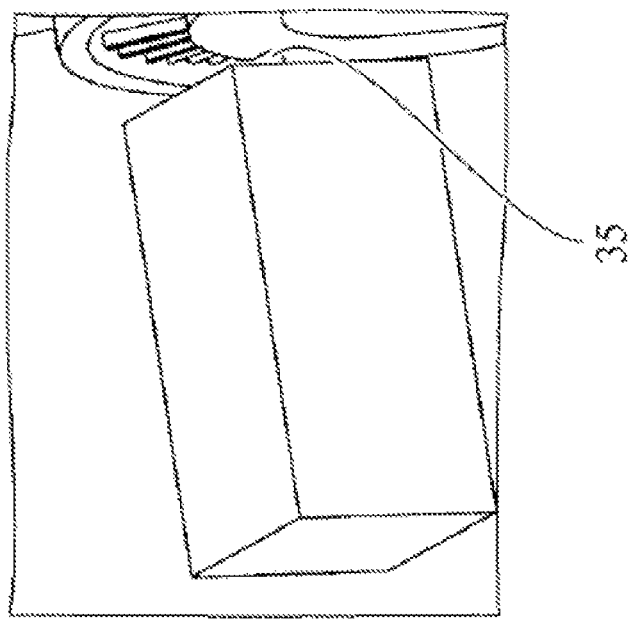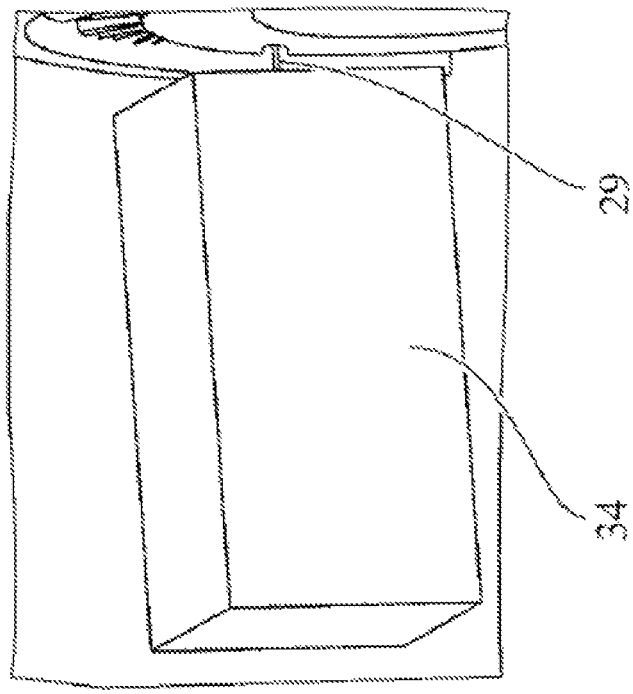
Fig. 12

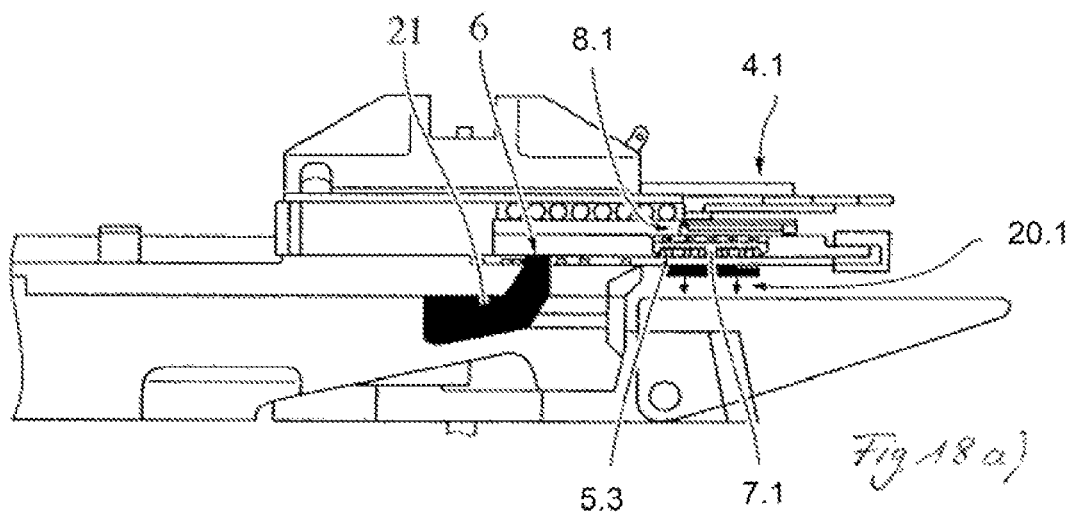
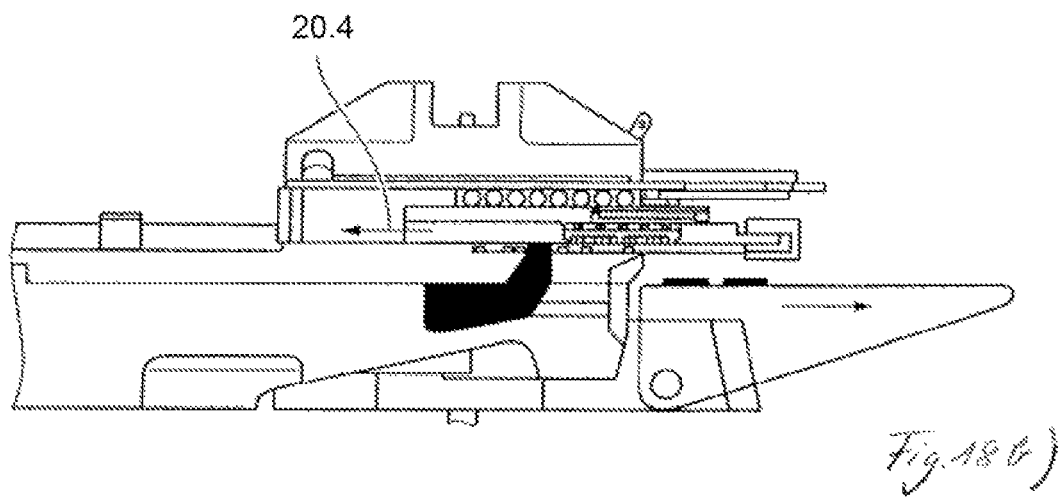
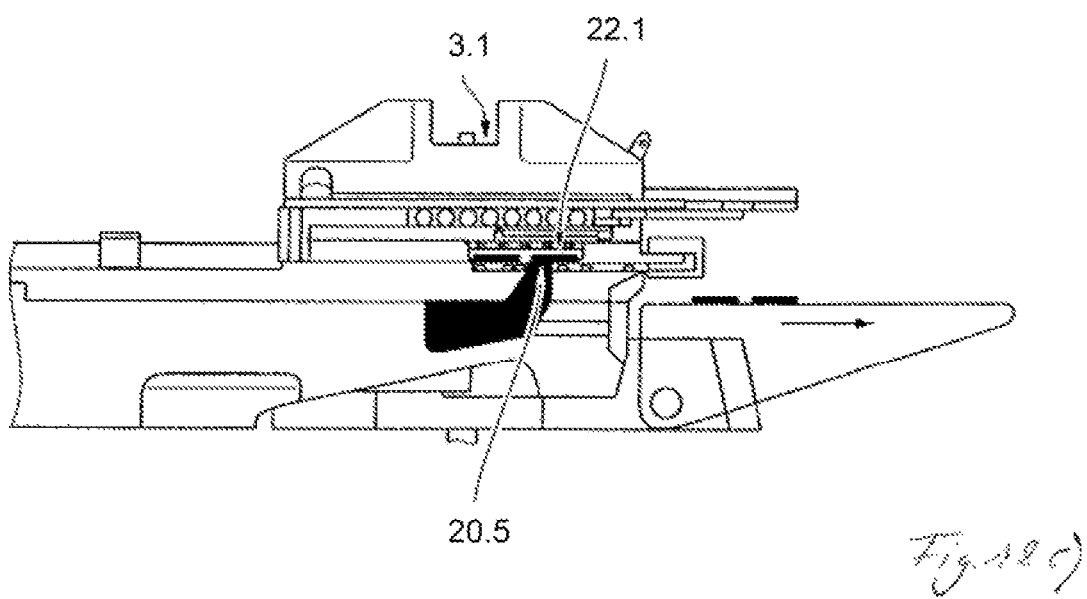

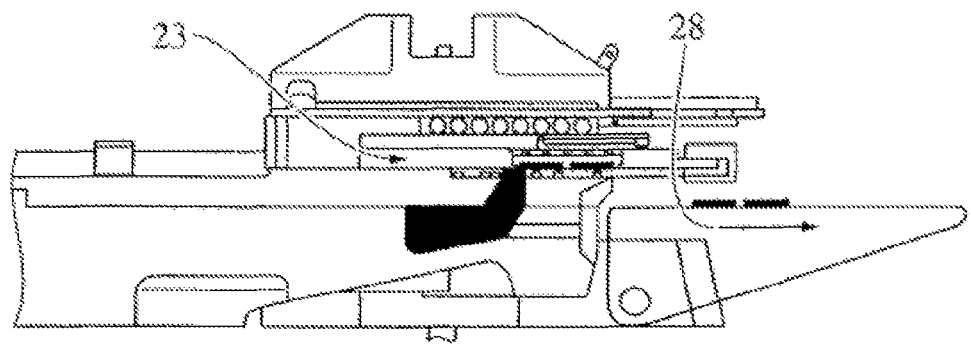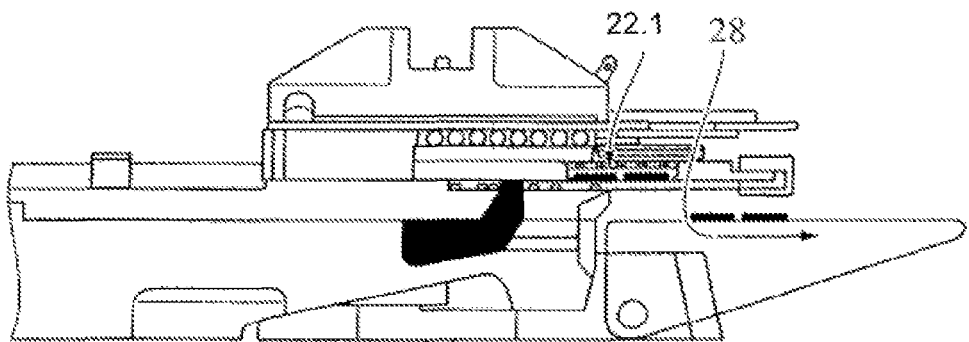

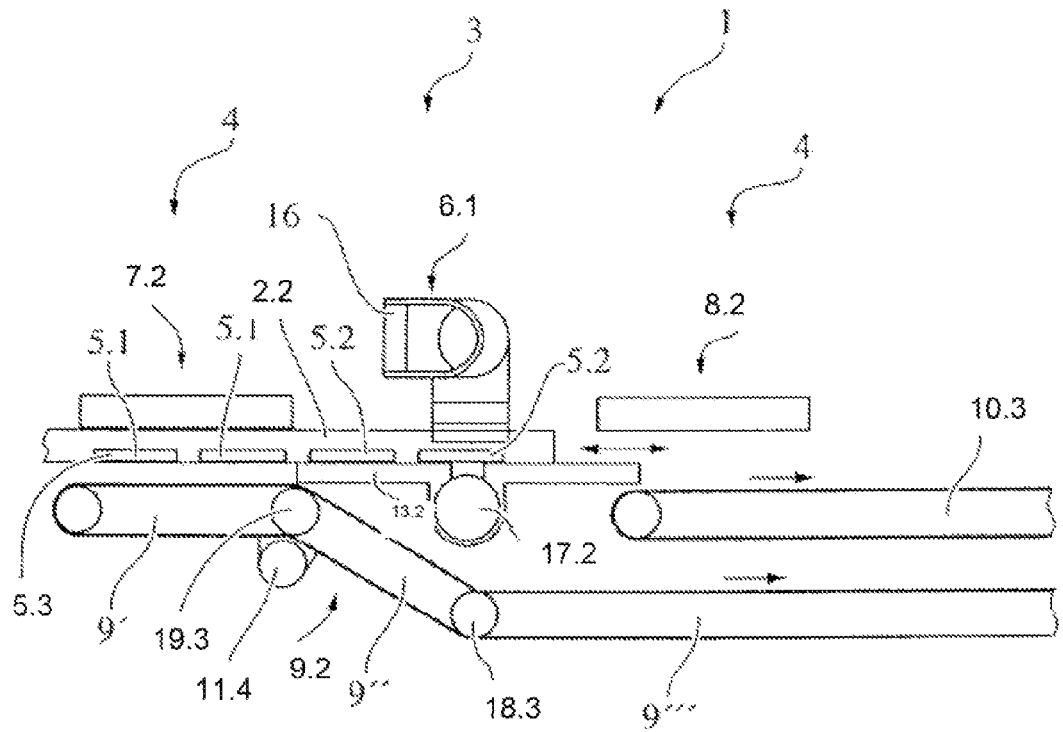
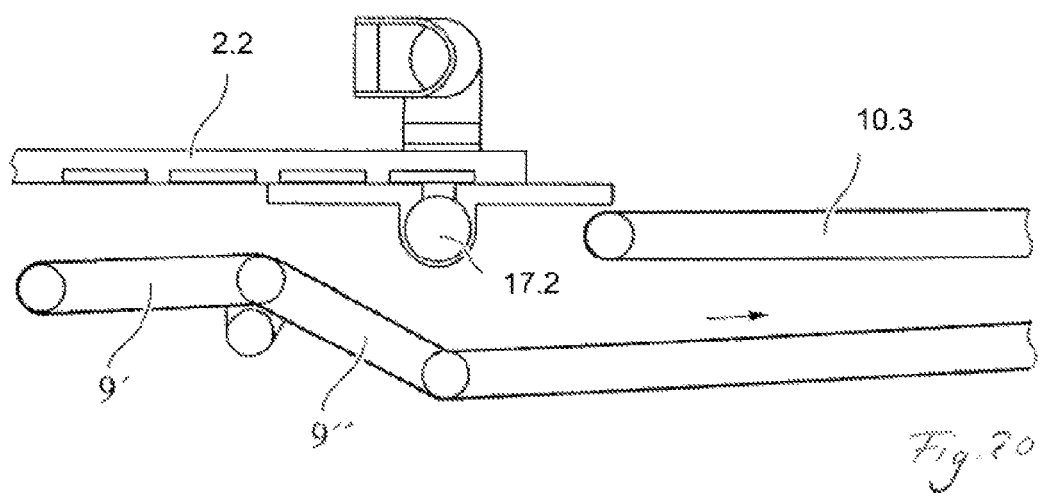

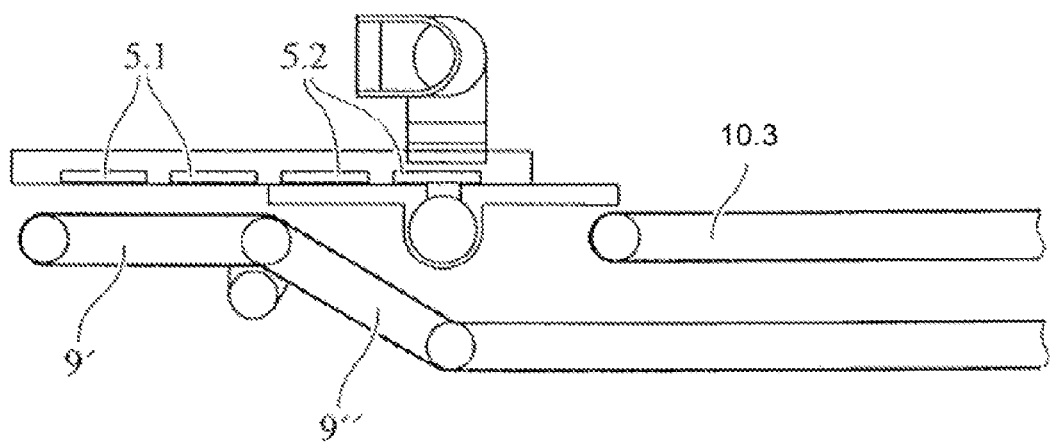

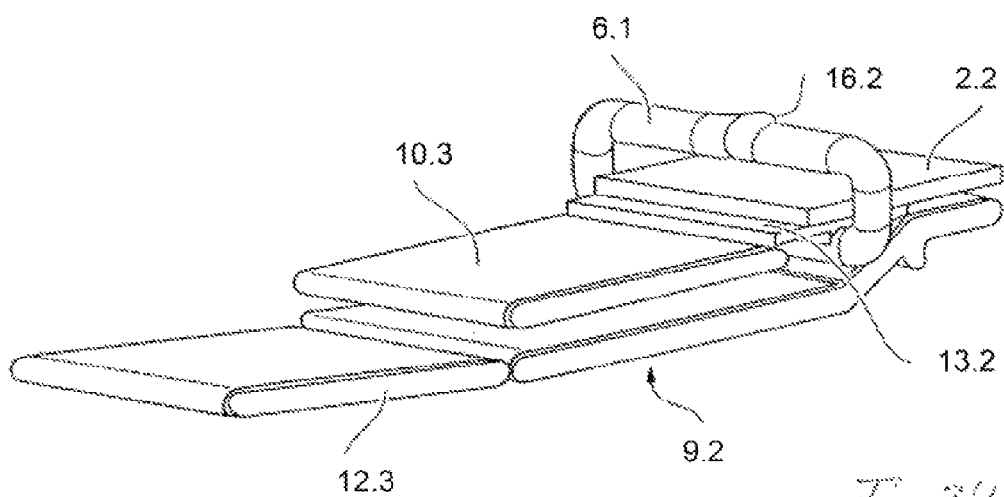
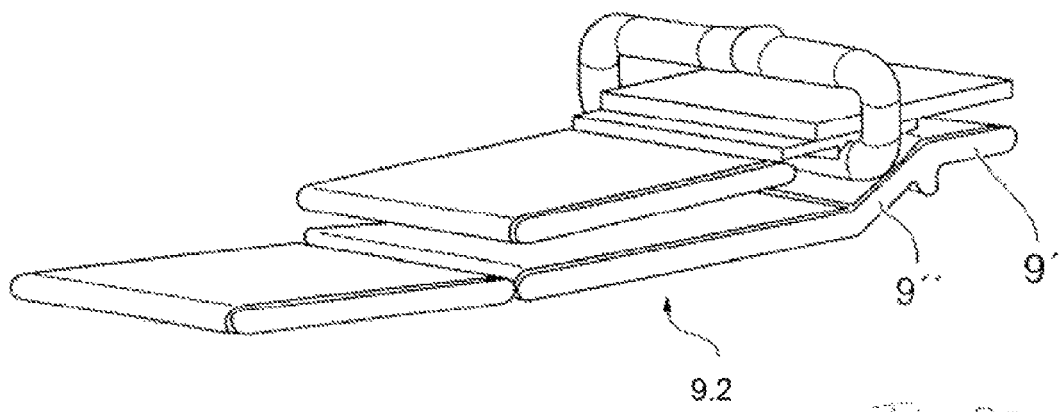

3D-FOOD PRODUCT FORMING APPARATUS AND PROCESS

CLAIM OF PRIORITY

This application is a national phase filing under 35 USC §371 from PCT Application serial number PCT/EP2011/002075 filed on Apr. 26, 2011, and claims priority therefrom. This application further claims priority from EP 10004318.1 filed on Apr. 23, 2010, EP 10008660.2 filed on Aug. 19, 2010, EP 10009039.8 filed on Aug. 31, 2010, EP 10010255.7 filed on Sep. 23, 2010 and EP 10013264.6 filed on Oct. 4, 2010 all are incorporated herein by reference.

TECHNICAL FIELD

The present invention is related to a food forming apparatus to produce patties with a form member which comprises moulds in which the patties are formed, whereas the form member is located adjacent to a pressure member and is at least partially made from a porous material.

BACKGROUND OF THE INVENTION

Food product forming apparatus are known from the state of the art and are used to shape food products, for example meat, fish, spinach or cheese. This apparatus normally comprises either a form plate which is moving reciprocally from a fill-position to a discharge-position. In a different embodiment, the machine comprises a rotating form drum in which the products are formed and subsequently discharged. In many cases, the mould, in which the food products are formed into patties is at least partially made of a porous material. This porous material has the advantage, that the mould can be vented during filling and that a medium, for example air, can be discharged through the porous material in order to remove the formed patties from the mould. In most cases, these patties are shaped disc-like; i.e. 2-D-shaped. However, there is an increasing demand to provide patties with a more complex structure, 3D-structure.

SUMMARY OF THE INVENTION

It was therefore the objective of the present invention to provide a food product forming apparatus and a process in which more complex patties can be produced.

The problem is solved with a food forming apparatus to produce patties with a form member which comprises a mould in which the patties are formed, whereas the form member is located adjacent to a pressure member and is at least partially made from a porous material and the pressure element is 3D-shaped.

The present invention relates to a food product forming apparatus. This apparatus comprises a form member in which the food product, for example minced meat, is brought into the desired shape. This form member can be either a form plate or a form drum. In case the form member is a form plate, this plate moves reciprocally from a fill-position to a discharge-position. In case the form member is a drum, this drum rotates continuously. In one angular position of the drum, moulds in the drum are filled with the food and in another angular position, the formed patties are discharged.

According to the present invention the form plate is located adjacent to a pressure member and preferably between a de-aeration member, preferably a plate or a drum and the pressure member. The de-aeration member allows the venting of the mould, while it is being filled. The de-aeration member can also be used to connect the mould to a pressure medium source, for example to eject the patties from the mould.

The person skilled in the art understands that the venting-function and the connection to a pressure medium source can also be integrated into the form member. The de-aeration member is normally located on the opposite side of the form member relative to side, from which it is filled, while the pressure member and the means to fill the mould are located on the same side. The pressure member is preferably used to avoid leakages during the filling of the food mass into the mould, to compress the food product at least slightly in the mould and/or to cut off the material in the mould from the food mass supply in a fill chamber.

In order to form the food product into patties, the form member comprises at least one, preferably a plurality of moulds, which are at least partially made of a porous material. The porous material has the advantage, that the mould can be vented during filling of the mould to remove entrapped air and/or to supply a pressurized medium, for example air, to eject the formed patties out of the mould. Preferably, at least the bottom of the mould is made of a porous material.

The form member can be made entirely out of a porous material or the form member can comprise one or more porous inserts. These inserts can comprise one or more moulds. Preferably, the moulds are not exchangeable but irreversibly coupled with the plate, for example by gluing, welding, soldering and/or a friction-fit. The porous structure can be made out of sintered material, for example stainless steel, plastic, aluminum, ceramics and/or a combination of these materials. The same is true for the porous inserts. The mould can consist of a porous side wall and a porous bottom wall or only of a porous bottom wall. The pore cross-section of the porous material is preferably designed such that it is permeable for gas, preferably air. Preferably the pore diameter is from 2 to 40 microns. When only using a permeable bottom wall, the other surfaces of the mould are preferably made of an anti-stick material, like Teflon, and/or coated with such a material. Preferably, the mould allows the forming of a 3D-shaped product; i.e. a product that does not comprise a constant thickness over its entire extension. Thus, the bottom of the mould is preferably not flat but 3D-shaped.

The porous structure can be made for example by milling, laser drilling or spark erosion or sintering, preferably direct sintering of the porous structure into a cavity of the plate. In that way, the pores will not be closed or only closed to a very small degree during its manufacturing.

In order to provide a high capacity, the inventive food product forming apparatus preferably comprises multiple moulds arranged in a row. Even more preferably, the inventive apparatus even has multiple rows, each row comprising a plurality of moulds. These rows can be in a continuous process filled one after the other. In a discontinuous process, when for example a reciprocating plate is used, two or more rows are preferable filled simultaneously.

As already mentioned above, the moulds are preferably connected to the ambient and/or a pressure medium supply, for example a gas and/or water supplies. This takes preferably place via the de-aeration member. The moulds in one row are preferably connected, for example via a channel to the ambient and/or to the pressure medium supply. The connection can be part of the form member itself, in the de-aeration member, in a manifold, which is connected to the form member or in the adjacent surface between the form member and the manifold or the de-aeration member. When using multiple rows of moulds in a form member, especially for large capacities, all moulds can be connected with each other. However, a separation of the ventilation and/or pressure medium supply per row is preferred in order to provide a homogenous supply of the pressure medium.

After the patties have been formed they have to be removed from the moulds. This is preferably done by ejecting a gas, preferably air, through the porous structure of the mould. Preferably, the ejection is an impulse. In case air is not sufficient to remove all food products from the mould, preferably water or another fluid is preferably inserted most preferably sprayed into the mould prior to its filling. In case that the form member is a plate, this can be done during the ingoing stroke of the plate; i.e. during the movement of the plate from the discharge to the filling position. With this fluid, a thin film will be created on the bottom wall and/or on the side walls of the moulds, which at least partially prevents the food product from sticking against the wall.

The product to be formed is pressed from a fill chamber into the moulds of the form member. During this filling air entrapped in the form plate mould will escape via the porous structure of the mould into the atmosphere.

An option when processing an extremely sticky food product is to blow air with low air pressure in the mould or to avoid, that the mould is vented so that a film of air is at least locally created between the food product and the mould.

In case the formed patty is a thin product, preferably the air ventilation is closed and/or a negative pressure is created between the mould and the patty. This hinders the patty to fall out of the mould during the movement of the form member.

In case the mould comprises a porous bottom and a porous sidewall, preferably the bottom and the side wall comprise a separate ventilation and/or pressure medium supply, respectively.

According to one embodiment of the present invention the form member is a plate, which reciprocates between a filling and a discharge position. Such a forming plate is for example described in EP 0 818 148 A1. This patent application is hereby included by reference so that its description is part of the present description.

In this patent application a forming machine is described with a spring element, for example an o-ring which presses the pressure member, here a pressure plate against the form member, here a from plate and the form member against a de-aeration member. The clearance between the pressure member, the form member and the de-aeration member is eliminated with the spring element and no leakage takes place. The pressure member has according to another or a preferred embodiment of the present invention cutting means such that the form product is cut when the form plate is moving from the filling to discharge position.

In order to insure a minimum surface pressure and still adequate sealing between the pressure member and the form member, the pressure member is preferably flexible, so that it equalizes roughness and/or unevenness in the surface of the forming plate.

Even more preferably, the pressure of the pressure element can be adjusted, for example by an inflatable O-ring. This ring can be inserted into an indentation in the surface of the pressure member. Its shape, preferably its diameter can be altered for example by pressurized air and/or pressurized water. The pressure of the pressure element is preferably controllable even more preferably controllable by a computer system. The pressure is preferably adjusted depending on the material of the form member and/or the material of the pressure plate, the wear of the form member and/or the pressure member and/or based on the food product to be formed. The pressure plate can comprise two or more pressure elements whose pressure can preferably be altered independently from each other.

In a preferred embodiment, the apparatus comprises a base member, whose surface preferably interacts with the pressure member. The pressure element is preferably located between the pressure member and the base member. More preferably, the surface adjacent to the pressure member is 3D-shaped, to assure a 3D-shaped product can be removed from the inventive apparatus, especially an apparatus with a form plate.

To ensure that especially fibrous food products as whole muscle meat, spinach or the like are not withdrawn from the mould during the movement of the form member, for example during the outgoing stroke, a knife preferably a knife with a serrated and/or waved blade in the pressure member is provided according to an inventive or preferred embodiment of the present invention. In order to assure high hygiene, the knife is preferable integrated into the pressure member itself; i.e. the pressure member and the knife are preferably one piece of material. Preferably, the pressure member comprises an opening through which the food product is fed into the moulds. The knife is preferably provided at the circumference of this opening. The blade of the knife is preferably produced by water-jet cutting. When the form member with its mould is fully charged with food product, the form member moves to its discharge position and passes the stationary mounted knife and the bottom side of the formed product and its fibers will be cut off.

According to another or a preferred embodiment of the present invention, the apparatus comprises an insertion unit to insert a stick into each patty. The stick is especially desirable in case, the food product is so called finger-food. More preferably, the means is a slot.

Preferably, the insertion unit is located at the front end of the form member, which is even more preferably a drum.

In a preferred embodiment of the present invention, the insertion unit is movable, preferably along at least a segment of a circular arc. Thus, the insertion unit can, for example, co-rotate together with a drum, so that the drum can be operated continuously.

In another preferred embodiment of the present invention, the food product forming apparatus comprises a cam that pushes the stick into the patty, while the form member, especially the drum, is advancing. The stick is only inserted into the cavity and/or the formed patty and then pushed into the patty by the cam. The cam can be shaped as a ramp. Preferably, the cam is located at the front end of a drum.

Preferably, the stick is inserted into the food product during the movement of the form member from the filling to the discharge position. Another subject matter of the present invention is therefore a process for the insertion of a stick into a patty, which are formed in a forming member, whereas the stick is inserted while the forming member advances.

Another subject matter of the present invention is a process for the insertion of a stick into a patty, which is formed in a forming member, whereas the stick is at least partially inserted while the forming member advances and/or whereas the stick is moved relative to the forming member for insertion into the patty by an insertion unit.

In a preferred embodiment of the inventive process, the forming member is a drum. Preferably, the rotation is stopped or maintained during the insertion of the stick.

Preferably, the insertion of the stick in one row and filling of the cavity in another row takes place at least partially simultaneously.

Another preferred or inventive embodiment of the present invention is a food forming apparatus with a mould-plate that is reciprocable between two positions and that comprises cavities, which are filled in the filling station with a patty-material and which are emptied in the discharge station and which comprises a stationary plate, whereas it further comprises rolling elements located between the plate and the mould-plate.

The present invention relates to a food forming apparatus. In the food forming apparatus, a patty material for example any formable, eatable material such as a dough, minced meat or the like, can be formed into a desired shape. This shape can be two dimensional, i.e. a disc or three dimensional, i.e. a ball. According to the present invention, the food forming apparatus comprises a mould plate that reciprocates between two different positions; i.e. a filling and a discharge position. This mould plate comprises cavities, into which the patty material is filled, preferably pressed and thereby formed. The mould plate preferably comprises a multitude of cavities which are arranged in an array, i.e. which comprise a multitude of parallel rows, each row preferably comprising a multitude of cavities. The rows are preferably arranged perpendicular to the direction of motion of the mould plate. Preferably, the cavities in one row and/or one or more rows are filled simultaneously in the filling station. Preferably, the cavities in one row and/or one or more rows are then emptied simultaneously in the discharge station.

According to the present invention, the inventive food forming apparatus comprises a plate, which is preferably part of the housing of the food forming apparatus and thus stationary. Between this plate and at least one surface of the mould plate, rolling elements are arranged. These rolling elements reduce the friction of the mould plate during its motion between the two positions. Additionally the rolling elements provide a large contact area against which the mould plate can be pressed directly or indirectly. Due to the large contact area, no or only little pressure-peak occur and/or the mould plate does not bend.

Preferably, the rolling elements are provided in a cage, in order to prevent that the rolling elements touch each other and/or have always equal distance from each other In a preferred embodiment of the present invention, the length of the rolling elements is essentially equivalent to the width of the mould plate, i.e. the horizontal extension of the plate perpendicular to its direction of motion. The rolling elements are preferably cylinders more preferably with a relatively small diameter, for example 10-30 mm, preferably 15-25 mm and even more preferably 19-21 mm. Preferably these cylinders are arranged side by side with a relatively small distance in between, i.e. only sufficient space that the cylinders do not touch each other. This preferred embodiment of the present invention assures, that there are no or little pressure peaks; i.e. that there is an equal pressure distribution along the mould plate, especially along the part of the mould plate where the mould cavities are located.

In another preferred embodiment of the present invention, the food forming apparatus comprises a locking plate adjacent to the mould plate and fixed to the mould plate. Preferably the rolling elements are arranged between the stationary plate of the food forming apparatus and the locking plate. The locking plate prevents that the material will be pressed out of the form plate and/or is utilized as a counter plate for the rollers to avoid indentations from the rollers into the form plate. Preferably the food forming apparatus comprises a bottom plate.

In another preferred embodiment of the present invention, the food forming apparatus comprises a seal plate between the bottom plate and the mould plate. This seal plate seals especially the area around the inlet of the food forming material. Furthermore, the seal plate assures, that the food forming material is only distributed in the cavity but not around the cavity. Material, that stands out of the cavity is preferably cut off by the seal plate. Thus, in a preferred embodiment, the seal plate comprises cutting means to cut off food forming material that stands beyond the mould cavity.

Preferably, the seal plate is pressed against the mould plate with spring elements preferably adjustable spring elements. With the adjustment of the spring elements, the pressure between the seal plate and the bottom plate can be adjusted based on the food forming material. Furthermore, wear can be equalized.

Preferably, the mould plate comprises a porous mould region. In this porous mould region, the mould plate is made of a porous material, for example a sintered material. Through this porous material air can be ejected to remove the formed patties out of the cavities. Furthermore, the passages in the porous material can be utilized to vent the cavities.

Preferably, the porous mould region is an insert into a frame of the mould plate. Preferably, the insert comprises a multitude of cavities. The cavities are for example inserted into the porous mould region by metal cutting.

In another preferred embodiment, the mould region comprises one insert per cavity.

In a yet another preferred embodiment of the present invention, the food forming apparatus comprises one or more means to divide the airflow between two or more cavities or rows of cavities. This embodiment of the present invention is especially advantageous to avoid air-shortcuts. Preferably this means is not only present in the gap between the air inlet and the mould- and/or the locking plate but extends also at least partially into the porous material.

Additionally or alternatively, the means can be utilized to secure an insert in the plate and/or as a pressure member, to assure that the insert is tight relative to the form plate.

Another inventive or preferred embodiment of the present invention is a food forming apparatus with a mould-plate that is reciprocable between two positions and that comprises cavities which are filled in the filling station with a patty-material and which are emptied in the removal station, whereas it comprises two discharge stations and one belt per removal station.

The present invention relates to a food forming apparatus. In this food forming apparatus, a patty material which is formable, for example a dough, minced meat or the like, can be formed into a desired shape. This shape can be two dimensional, i.e. a disc or three dimensional, i.e. a ball. According to the present invention, the food forming apparatus comprises a mould plate that reciprocates between two different positions; i.e. a filling and a discharge position. This mould plate comprises cavities, into which the patty material is filled, preferably pressed and thereby formed. The mould plate preferably comprises a multitude of cavities which are arranged in an array, i.e. which comprise a multitude of parallel rows, each row preferably comprising a multitude of cavities. The rows are preferably arranged perpendicular to the direction of motion of the mould plate. Preferably, the cavities in one row and/or one or more rows are filled simultaneously in the filling station. Preferably, the cavities in one row and/or one or more rows are then emptied simultaneously in the discharge station.

According to the present invention, the inventive food forming apparatus comprises two discharge stations, which are located to the left and the right of the filling station. The mold plate reciprocates between these two stations. In these discharge stations, the formed patties are removed from the cavity. According to the present invention, the inventive food forming apparatus comprises an individual belt per removal station. Thus, the inventive apparatus can be operated with much more flexibility than the apparatus according to the state of the art. The two belts can be operated with the same or different speeds. The transportation direction of the two belts is preferably identical. Preferably, one belt is longer than the other and more preferably, the longer belt is operated at a higher speed than the shorter belt. Preferably, the belts are located at least partially at different heights. More preferably, at least one belt can comprise means to lower or lift it at least partially. In another preferred embodiment of the present invention at least one belt comprises different segments, which more preferably can be moved even more preferably rotated relative to each other.

Preferably, at least one belt comprises means to alter the height of the belt at least partially before and/or during the transportation of the patties. In a preferred embodiment, the belt is tilted and/or partial segments of a belt are lowered and lifted. This preferred embodiment of the present invention has the advantage, that during the removal of the patties from the mold plate, the distance between the mold plate and the belt can be very small, so that deformation or destruction of the patties during their drop from the mould plate onto the belt can be avoided. During transportation along the belt however, the distance between the surface of the belt and the other parts of the inventive food forming apparatus can be relatively large to avoid a collision between the formed patties on the belt and other parts of the inventive food forming apparatus.

Preferably, the two belts are connected by a seesaw. One end of this seesaw can be brought into alignment with each of the belts. Thus, the patty load of the two belts can be combined on one belt, which is located downstream of the seesaw. The seesaw preferably also comprises a belt. This belt can be operated at different velocities than the velocities of the first and/or second belt of the food forming apparatus in order to increase or decrease the distance between two patty rows. This holds also true for the transportation means downstream of the seesaw.

Preferably, at least one of the belts, the seesaw and/or the belt downstream are shiftable sidewards, i.e. in a horizontal direction perpendicular to the direction of transportation. This preferred embodiment allows to stagger the patties on the belt.

According to a preferable or another inventive embodiment of the present invention, the mold plate is at least partially porous. Preferably, the cavities especially their bottom and their sidewall are made of a porous-, for example a sintered-material. This embodiment of the present invention has the advantage, that the patties can be ejected out of the plate for example with air. Additionally, the cavity can be vented via the porous material during filling of the cavities.

In another preferred or inventive embodiment of the present invention, the outlet of the filling station is below the mold plate. This embodiment of the present invention has the advantage, that the filling and the discharge of the mould-plate takes place on the same sides of the mold plate, so that there need not be any through-holes in the mold plate.

Preferably, the inventive food forming apparatus comprises two outlet means, preferably two air outlet means to eject the patties out of the molds. This embodiment of the present invention has the advantage, that no pistons are needed to remove the patties from the mold plate.

According to another inventive or preferred embodiment of the present invention, the mold plate comprises a slot to accommodate a stick. The sticks are inserted into the patty and are utilized to hold the patty. The slot guides the stick during its insertion into the patty. The stick is preferably inserted into the patty by moving the mold plate relative to the stick and/or the stick relative to the mold plate. The slot has preferably a U-shaped, square or rectangular cross-section.

Preferably, the slot is in connection with a cavity. This facilitates the insertion of the stick into the patty via the slot. Preferably, the slot extends from the cavity in the mold plate to the side-limit of the mold plate that is oriented perpendicular to the direction of motion.

Preferably, the mold plate comprises to rows of cavities, each row comprising at least one, preferably a multitude of cavities, whereas the cavity/cavities in one row are staggered to the cavity/cavities in the other row. This preferred embodiment of the present invention has the advantage that the patties can be placed on a belt in a staggered pattern without moving the belt sidewardly.

Another subject matter of the present invention is a process for the transportation of patties, whereas the patties are staggered. This embodiment of the present invention allows to increase the load on the belt per unit-length. Furthermore it has advantages regarding the subsequent processing and/or packaging of the patties.

Preferably, the patties comprise a stick, whereas the sticks point at least partially in different directions. Preferably, one stick points in the direction of motion of the transportation belt, while the next one points in the opposite direction.

The inventions are now explained according to FIGS. 1-32. These explanations do not limit the scope of protection. The explanations apply to all inventive embodiments of the present invention likewise.

BRIEF DESCRIPTION OF THE DRAWINGS

FIGS. 1-4 show one embodiment of the inventive apparatus.

FIGS. 10-12 show another embodiment of the apparatus with stick insertion.

FIG. 18 a-18 e show the operation of the inventive food forming apparatus.

FIG. 19-23 show the inventive food forming apparatus and its operation.

FIG. 24-29 show another embodiment of the inventive food forming apparatus.

FIG. 32 shows a mold plate with staggered cavities

DETAILED DESCRIPTION OF THE DRAWINGS

Figure 3:
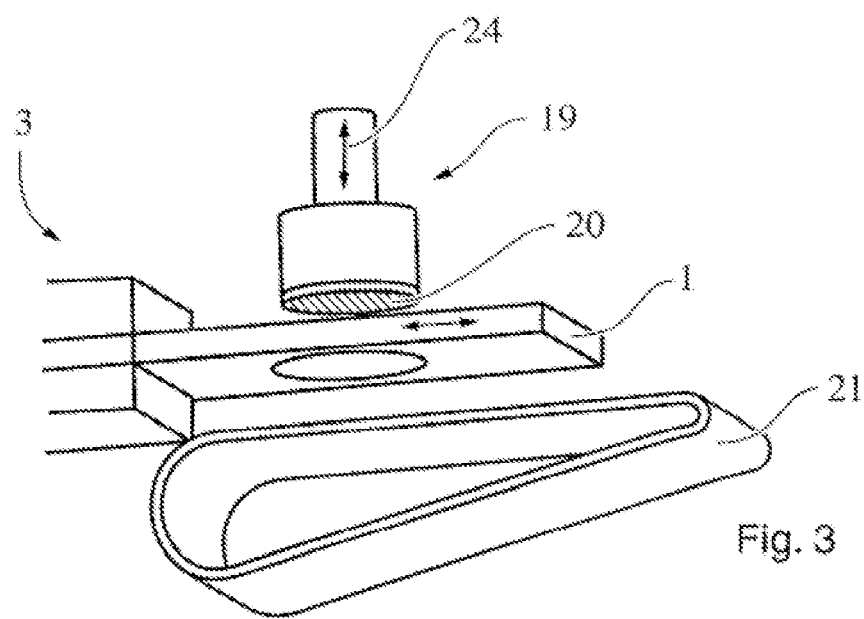

FIGS. 1-4 show one embodiment of the inventive forming apparatus. As can be seen from FIGS. 1 and 2, the food product forming apparatus 3 has a housing, which is denoted overall by 4 and comprises a base member 5, here a plate, a de-aeration member 2, here a plate, lateral guides 6 between these two components (see FIG. 2) and a closure member 7 which holds the de-aeration member 2, the base member 5 and the lateral guides 6 pressed against one another. The de-aeration member 2 has ventilation holes 8. The ventilation holes 8 can be utilized to allow the ventilation of the mould 11 during its filling to remove entrapped air. The ventilation holes 8 can also be used to eject a gas, for example air into the mould 11 to create an air cushion to reduce sticking of the patty in the mould 11. The lateral guides 6, the base member 5 and the de-aeration member 2 delimit a chamber 9, in which the form member 1 can be displaced between a position moved inwards, which is shown in continuous lines, and a position moved outwards, shown by broken lines. The inward position of the form member 1 is the so called filling position in which a mould 11 is filled with food mass. The outward position is the so called discharge position, in which the formed patty is discharged from the form member 1. The base member 5 has a feed opening 10 which is connected to the feed of the food mass (not depicted). In the moved-in position of the form member 1, the moulds 11 arranged therein are in communication with the feed opening 10. According to the invention, the base member 5 is preferably provided with a recess 12, in which a pressure member 13, here a plate is situated. The stationary pressure member 13 is shown in more details in FIGS. 5 and 6 and has an opening 14 which is aligned with the feed opening 10 in the base member 5. A groove 15 is arranged around this opening 14, in which groove a likewise encircling spring element 16, for example a rubber ring or an O-ring, is situated. This spring element 16 is supported on the base member 5, on its region around the feed opening 10. The pressure force resulting from the spring element 16 is preferably adjustable, so that on one hand the feed opening 10 is sealed but on the other hand the sealing force is not too high, to avoid wear of the spring element 16, the form member 1 and/or the pressure member 13 and/or to improve the sealing. The adjustment of the pressure force can be, for example, achieved with a hollow O-ring, into which a pressure fluid is filled. The pressure fluid changes the diameter of the O-ring and thus the pressure force. Preferably, the spring element 16 is computer-controlled. As a result, the pressure member 13 is held firmly pressed against the form member 1, so that any play of the said form member 1 in the internal chamber 9 in the housing 4 is eliminated, in the region of the feed opening 10. The spring element 16 also seals the gap between the pressure member 13 and the recess 12. By dint of this resilient pressure, scarcely any leakage now takes place between the pressure member 13 and the form member 1. Moreover, this pressure member 13, interacting with the form member 1, also has a cutting action, such that the fibers of the mass, such as meat fibers, are reliably severed when the form member 1 is displaced to its outwardly projecting position. In order further to improve the seal of the pressure member 13 with respect to the form member 1, preferably a further groove 17 is provided, in which an additional spring element 18 is situated. The pressure force of this spring element 18 is preferably also adjustable as described above.

Figure 4:
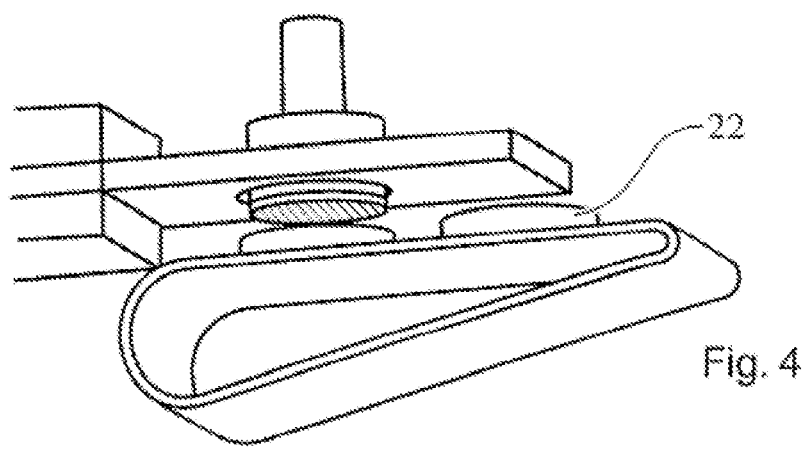

FIGS. 3 and 4 show details of the inventive food product forming apparatus 3 according to FIGS. 1 and 2. This food product forming apparatus 3 comprises a form member 1, here a plate, which reciprocates between a filling-position in which the moulds 11 in the form member 1 are filled with the food product and a discharge position in which the formed food products 22, the patties, are removed from the form member 1. The movement of form member 1 is depicted by the double arrow on the plate. FIGS. 3 and 4 depict the discharge position of form member 1. The inventive food product forming apparatus 3 preferably comprises a knock out cup 19 which is connected to a piston 24. The knock out cup 19 moves from a start-position to a knock-out-position and back as shown by the double arrow on piston 24. The knock out cup 19 comprises at its bottom a perforated plate or permeable bottom 20 which is permeable for a fluid medium, preferably gas and/or water. FIG. 3 shows the knock out cup 19 in its start position. FIG. 4 shows the knock out cup 19 after it has come into contact with the food product 22 in form member 1 and after it has moved through the form member 1 and has knocked out the food product 22 out of form member 1. After the food products 22 have been removed from form member 1, they fall on a transportation belt 21 and are transported to the next processing step. The person skilled in the art understands, that form member 1 can comprise a multitude of moulds 11 and correspondingly a multitude of knock out cups 19. The knock out cup 19 can be driven individually or together in groups. The person skilled in the art furthermore understands that form member 1 can be substituted by a intermittently or continuously rotating drum with holes in it. In this case, the knock out cups 19 are located preferably at the inside of the drum. The person skilled in the art further understands that the depiction of the food product 22 or patties is simplified and that they can have a 3D-shape. In the case, the bottom of the knock out cup 19, here the permeable bottom 20, needs to have a corresponding shape.

Figure 5:
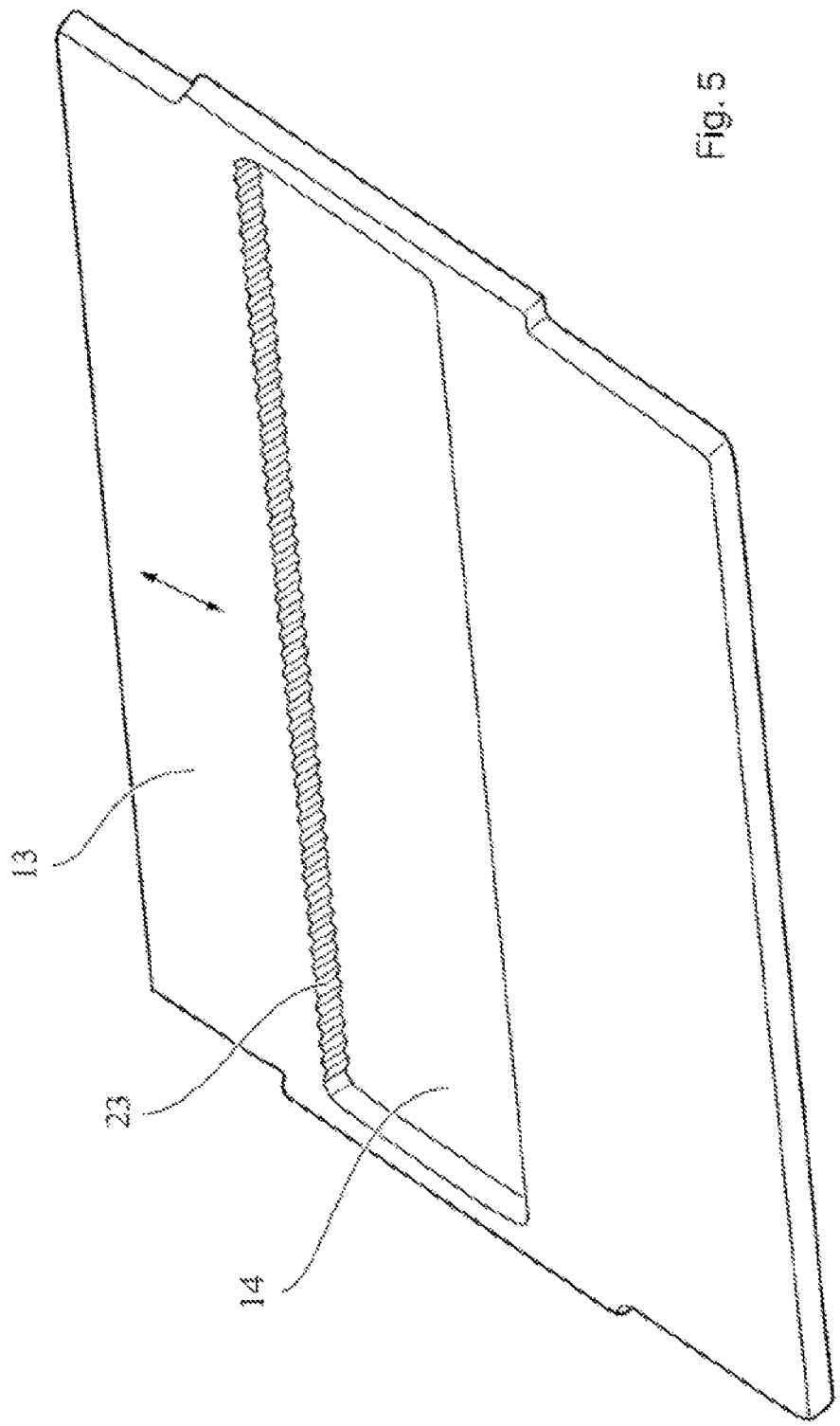
FIGS. 5 and 6 show the inventive pressure member.
Figure 6:
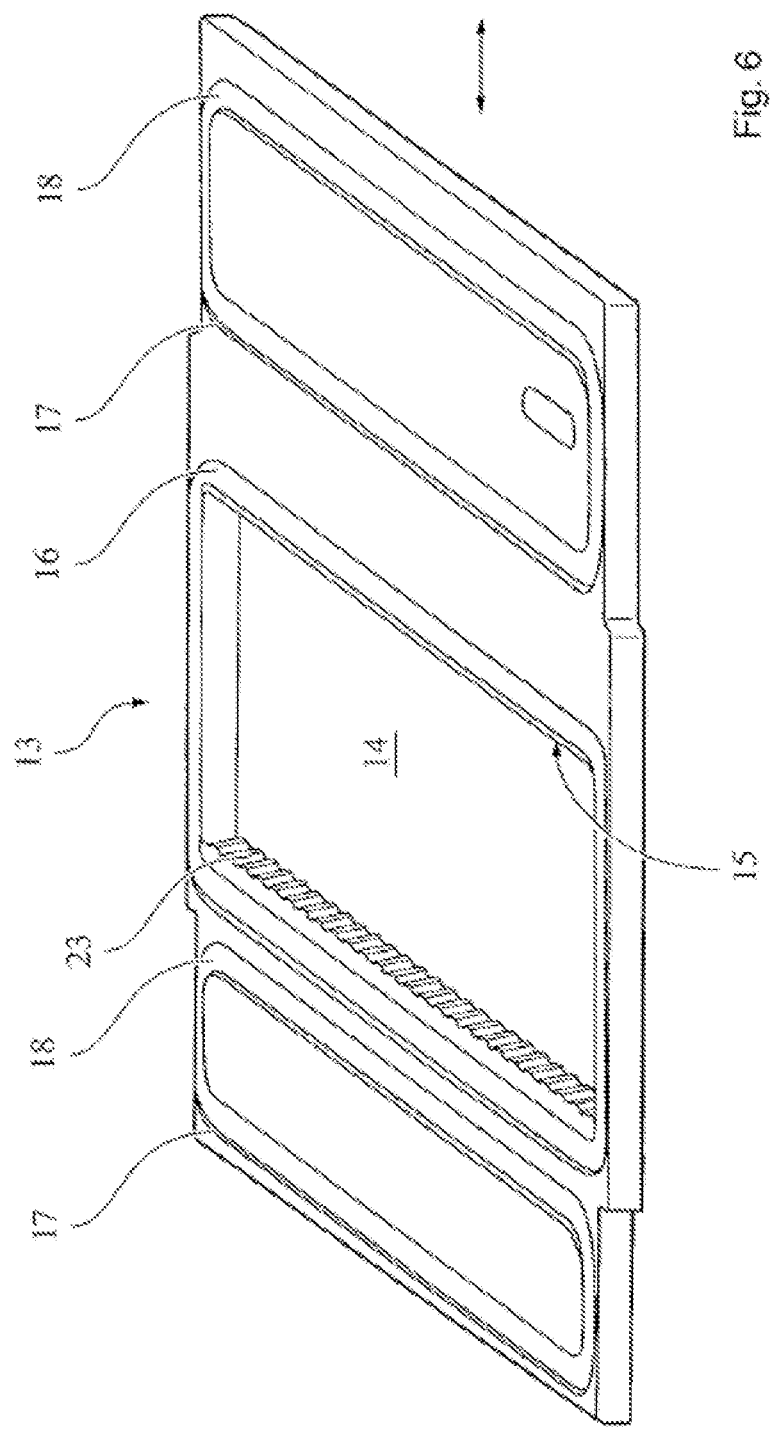

FIGS. 5 and 6 show details of the pressure member 13, which is here a pressure plate. This pressure member 13 is stationary and the top surface depicted in FIG. 5 is adjacent to the form member 1. The movement of the form member 1 is depicted by a double arrow. As described previously, the pressure member 13 comprises an opening 14 through which the food mass is fed into the moulds 11. This opening 14 comprises a circumference into which at least partially, the blade 23 has been worked. The blade 23 cuts the food product, for example fibers of the food product for example muscle-fibers, during the movement of the form member 1, especially during the outgoing movement of the form member 1 into the discharge-position. The blade 23 is located in the pressure member 13 such, that the inner surface of the formed patty and/or inner surface of mould 11 moves entirely across the blade 23 during the movement of the form member 1. A person skilled in the art understands that for forming a 3D-product it can be necessary to shape the pressure member 13 dimensionally too. In this case, the blade 23 is also 3D-shaped. The plate is preferably worked directly into the material of the pressure-member, i.e. the blade 23 and the pressure member 13 are made out of one piece. Preferably, the blade 23 is serrated and/or waved. Preferably, the blade 23 is produced by water-jet-cutting.

FIG. 6 shows the backside of the pressure member 13 according to FIG. 5. On this side, grooves 15 and 17 have been worked into the pressure member 13 which hold spring elements 16, 18 respectively. These spring elements 16, 18 are in the present case O-rings, which are preferably adjustable in their diameter as described above.

Figure 7:
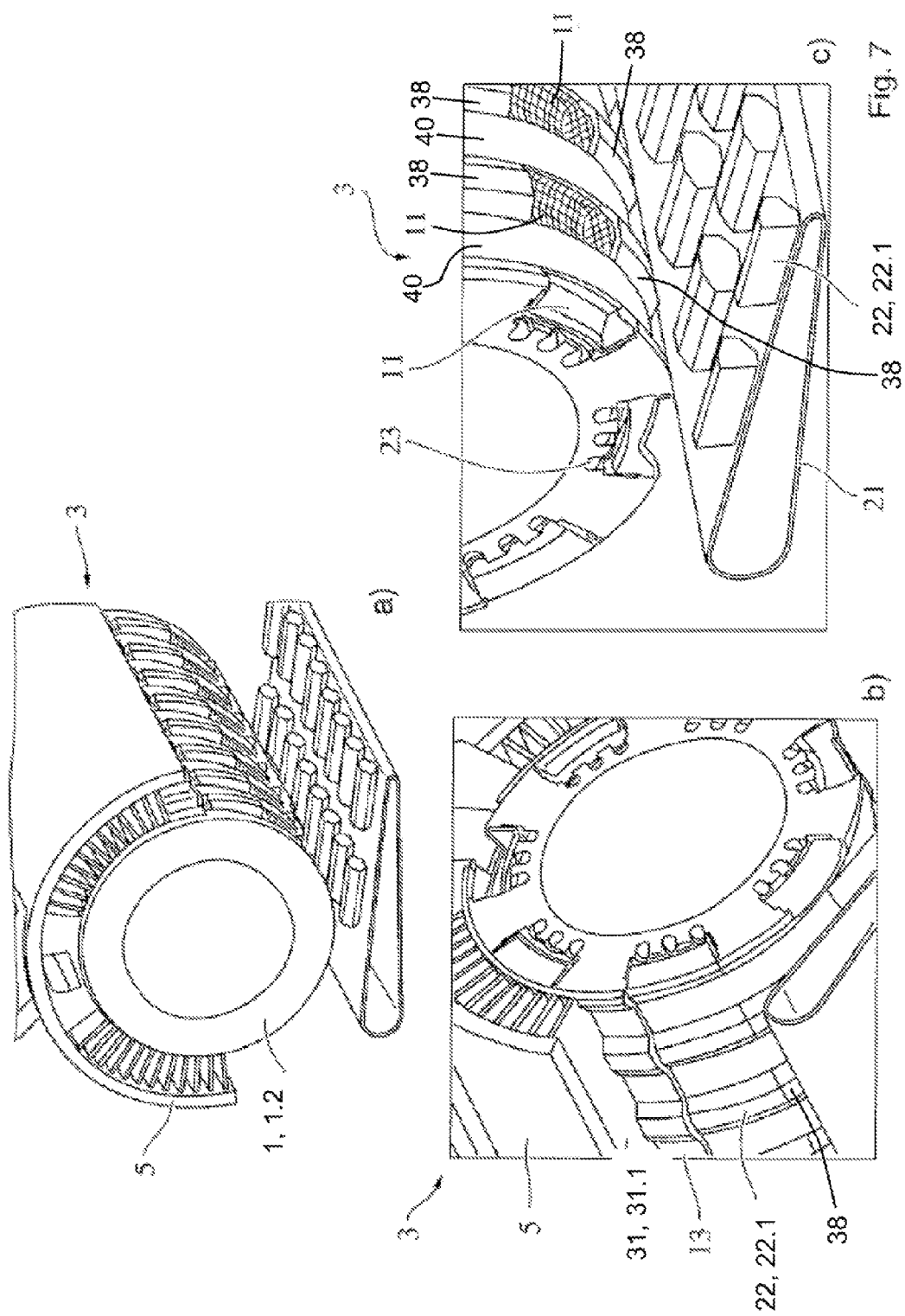
FIG. 7 shows another embodiment of the inventive apparatus.

FIG. 7 shows another embodiment of the inventive food product forming apparatus 3. The disclosure made regarding FIGS. 1-6 also applies to this embodiment. In this case, the form member 1 is a drum 1.2 that rotates continuously or intermittently. The circumference of the drum 1.2 comprises several moulds 11, which are located at different angular positions and which are preferably also located in parallel, in rows along the axial extension of the drum 1.2. The moulds 11 comprise in the present case porous inserts which are embedded in the drum 1.2. Each mould 11 is connected to a channel 25 and a branch, 28 through which the individual mould 11 can be vented and/or through which a pressurized medium can be ejected in order to remove the formed food products 22 or patties 22.1 from the moulds 11.

The inventive food product forming apparatus 3 further comprises a filling shoe which surrounds the circumference of the drum 1.2 partially. It can be seen especially from FIG. 7 *a*, that this shoe comprises adjacent to the circumference of the drum 1.2 a pressure member 13, which is in the present case 3D-formed in order to produce 3D-shaped patties 22.1 which can be especially seen in FIG. 7 *c*. Between a base member 5 and the pressure member 13, a pressure transfer means 31, here lamellas 31.1, can be located, which transduce a pressure from the base member 5 to the pressure member 13. The pressure member 13 is made in the present case of a flexible material so that is always in contact with the surface of the drum 1.2. The base member 5 comprises pressure means for example spring elements to press the pressure plates against the drum 1.2. These spring elements are preferably as already discussed above adjustable more preferred by a computer system. The drum 1.2 rotates, preferably continuously, from a filling position in which the food product 22 is fed into the moulds 11, to a discharge position, which is depicted in FIG. 7 *c*. In this discharge position, the formed patties 22.1 are discharged on a transportation belt 21 and transported away.

Figure 8:
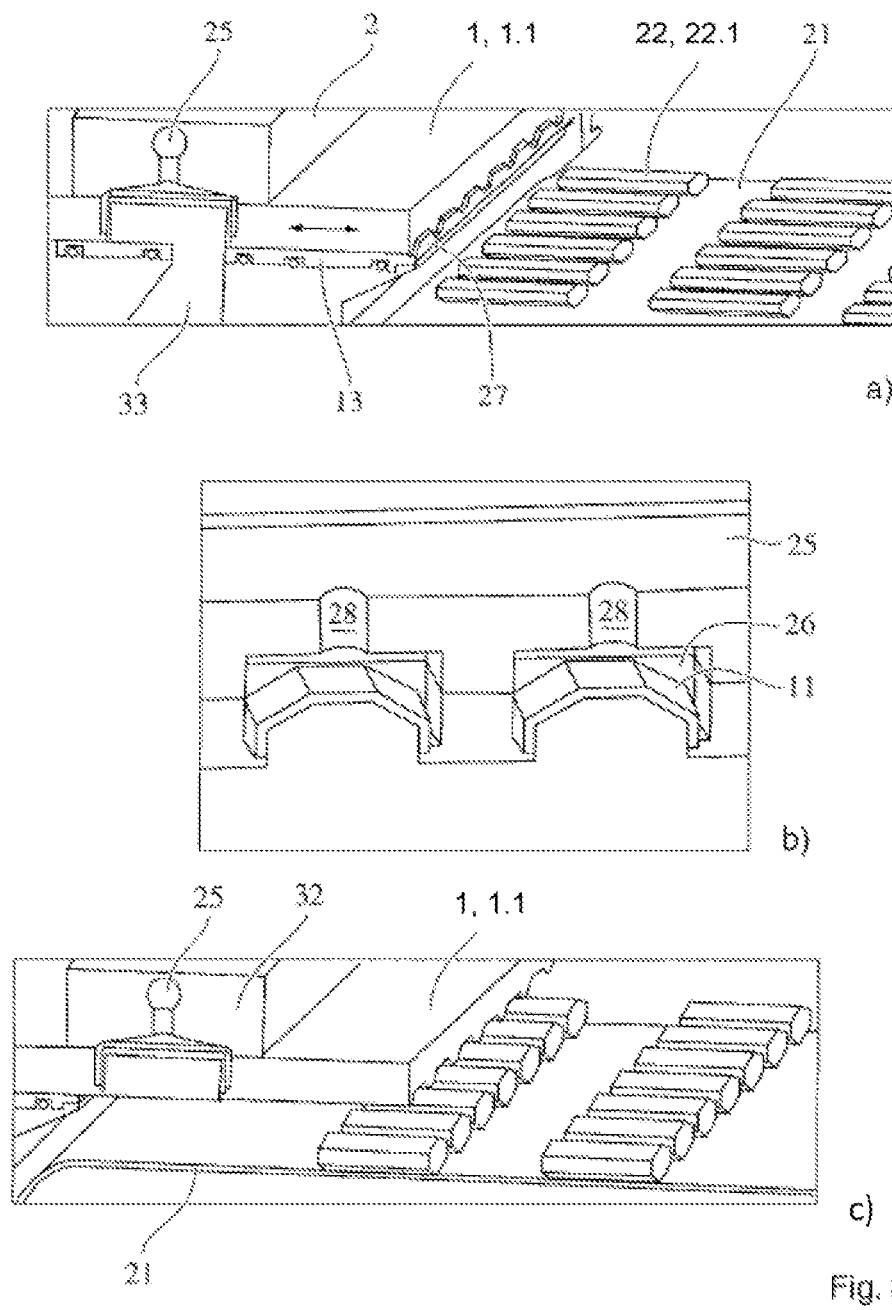
FIG. 8 shows further details of the apparatus according to FIGS. 1-4.

FIG. 8 shows further details of the embodiment of the inventive food product forming apparatus 3 according to FIGS. 1-4. In FIG. 8 *a*, a form member 1 is depicted in its filling position. In this filling position, a food mass 33 is fed into the individual moulds of the mould plate 1.1, which are located in parallel in a row. Below the mould plate 1.1 is a pressure member 13, which is in the present case 3D-formed; i.e. comprises indentations in order to allow the production of 3D-shaped products which are in the present case sticks with a regular poly-angular diameter. In order to allow ventilation of the mould 11 during its filling, the mould 11, which comprises in the present case a porous insert, as can be seen in FIG. 8 *b*, is connected to a channel 25 and branch 28 which can be connected for example to the ambient and allows the removal of the entrapped air. As depicted by the double arrow on the mould plate 1.1, the mould plate 1.1 is movable from the depicted filling position into a discharge position, which can be seen in FIG. 8 *c*. FIG. 8 *b* shows details of moulds 11, which are as already said, made from porous material. In the present case, the moulds 11 are inserts, which are inserted into a cavity 26. Each of these cavities 26 is connected to a channel 25 via a branch 28. The branch 28 and/or the channel 25 is located in a de-aeration member 2. FIG. 8 *c* shows the form member 1 in its discharge position. Here, the moulds 11 are connected via channels 25 to a pressure medium for example pressurized air which ejects the patties 22.1 out of the moulds 11. The channel 25 is here part of a stationary ejector 32. It can be especially seen from FIG. 8 *c*, that the surface of the form member 1, which is adjacent to the pressure member 13 is also 3D-formed, whereas the indentations of the pressure member 13 fit into convexities of the form member 1 and vice versa.

Figure 9:
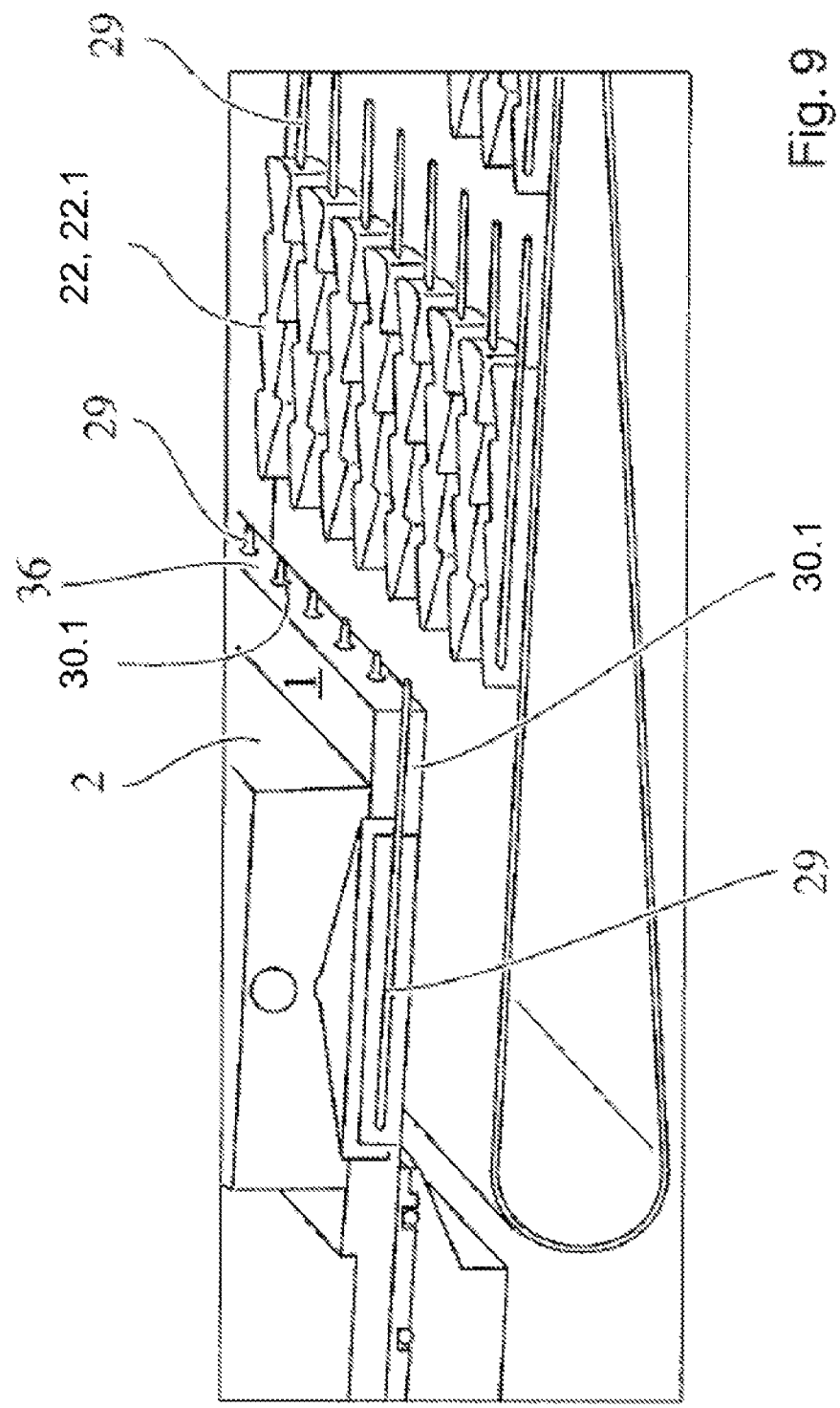
FIG. 9 show the stick insertion.

FIG. 9 shows the insertion of a stick 29 into the food product 22 or patties 22.1. The insertion of the stick 29 can take place during the movement of the form member 1 from the filling- to the discharge position or after the form member 1 has reached the discharge position. The person skilled in the art understands that the sticks 29 can be stationary and/or can be moved to utilized the insertion of the sticks 29. The sticks 29 are inserted into the patties 22.1 via a slot 30.1. By means of this slot 30.1 the patties 22 and the sticks 29 can be ejected in the discharge position.

Figure 10:
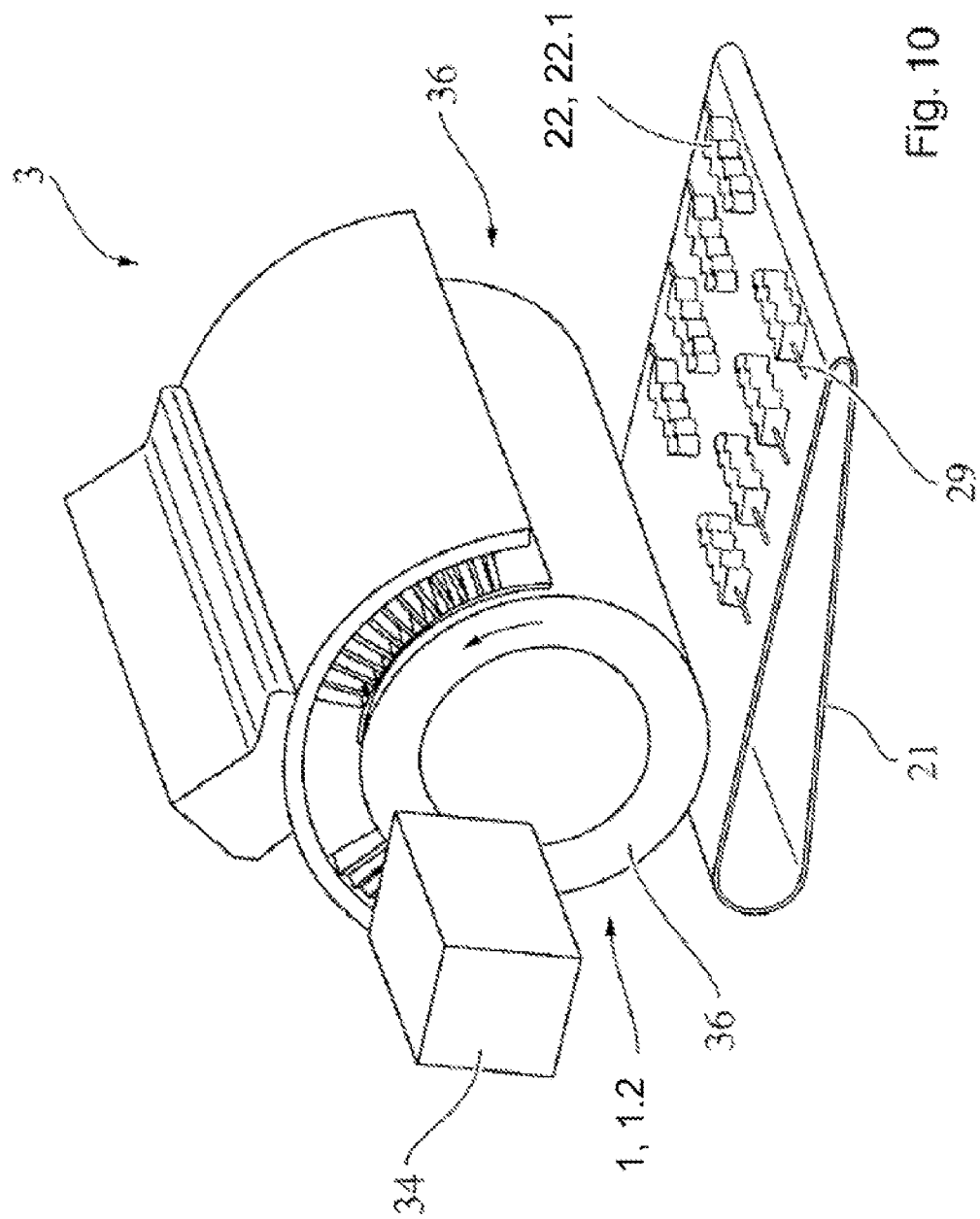
Figure 11:
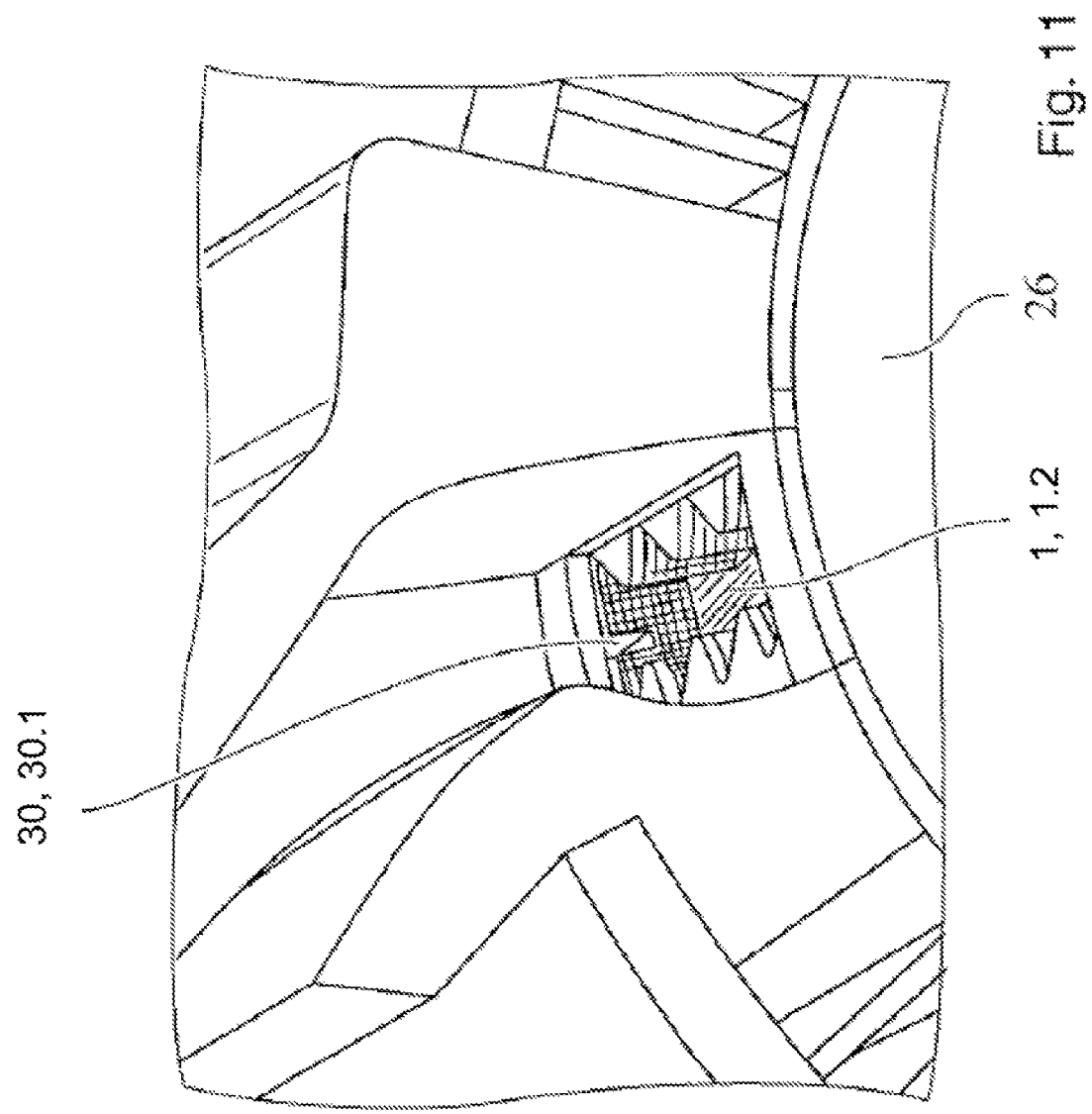

FIGS. 10-12 show another embodiment of the inventive food product forming apparatus 3, which comprises in the present case a drum 1.2, which rotates, as indicated by the arrow, counterclockwise. The drum 1.2 comprises cavities 26, in which patties 22.1 can be formed. Furthermore, the inventive food product forming apparatus 3 comprises at both of its front ends 36 stick insertion units 34, respectively, whereas each inserts sticks 29 into the patties 22.1. The patties 22.1 with its sticks 29 inserted are subsequently discharged on a transportation belt 21 and transported away from the inventive food product forming apparatus 3. As can be especially seen from FIG. 11, each cavity 26 is connected to an opening 30, here a slot 30.1, through which the stick 29 is inserted into the patty 22.1, which is formed in the cavity 26. In the present case, the cavity 26 is made from a porous material.

FIG. 12 shows details of the stick insertion unit 34, which comprises in the present case an insertion pin 35, which pushes stick 29 into the cavity 26 and thus into the formed patty 22.1. The stick insertion unit 34 can be either provided stationary or moveable. In case that the stick insertion unit 34 is stationary, the rotation of the drum 1.2 must be stopped while the stick 29 is inserted into the patty 22.1. In case that the insertion unit 34 is moveable, it preferably moves along a segment of a circular arch, while it inserts the stick 29 into the cavity 26. As soon as this is finalized, the stick insertion unit 34 moves back into its home position and then pushes another stick 29 into the patty 22.1. In a preferred embodiment, the inventive food product forming apparatus 3 comprises a multitude of rows of cavities 26 along its circumference. Preferably, while in one row the stick 29 is inserted, another row is filled with the food forming material, at least partially simultaneously. This can be either done while the form member 1 is moving or while it is stationary.

Figure 13:
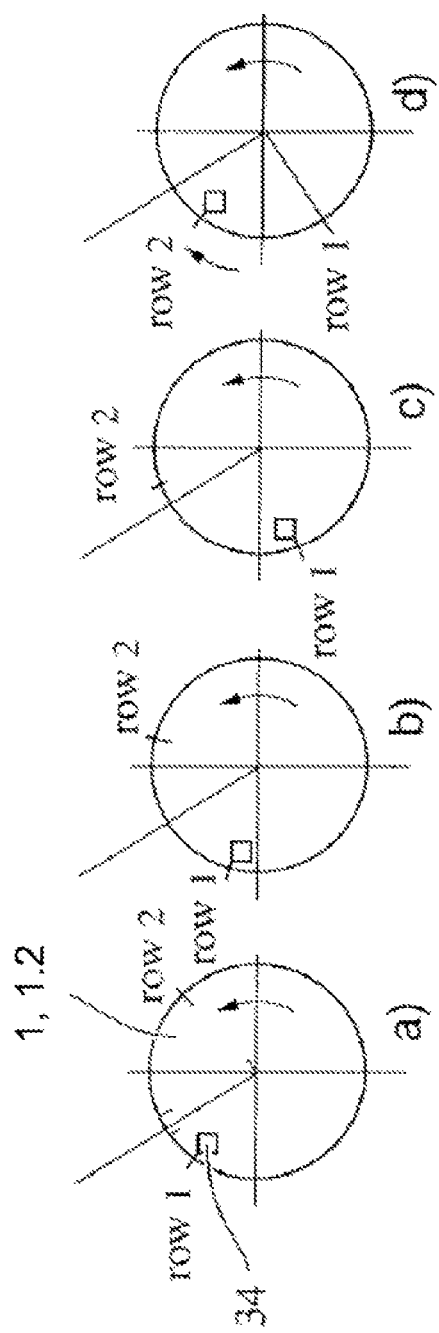
FIG. 13 shows a movable insertion unit.

In FIG. 13, a moveable stick insertion unit 34 is depicted. In FIG. 13 *a* the stick insertion unit 34 is shown in its home position. The form member 1, in the present case a drum 1.2, comprises a multitude of rows with at least one cavity. The drum 1.2 rotates counter clockwise. As soon as row 1 has reached the stick insertion unit 34, they co-rotate. During this co-rotation (please compare FIGS. 13 *b* and 13 *c*) the stick 29 is inserted into the cavity 26 and thus into the patty 22.1. As soon as this is finalized (please compare FIG. 13 *c*), the stick insertion unit 34 rotates clockwise (please compare FIG. 13 *d*) into its home position and then starts co-rotating with row 2 in order to insert a stick 29 into the cavity of this row. Preferably, the rotation into the home position is faster than the co-rotation during the insertion of the stick 29.

Figure 14:
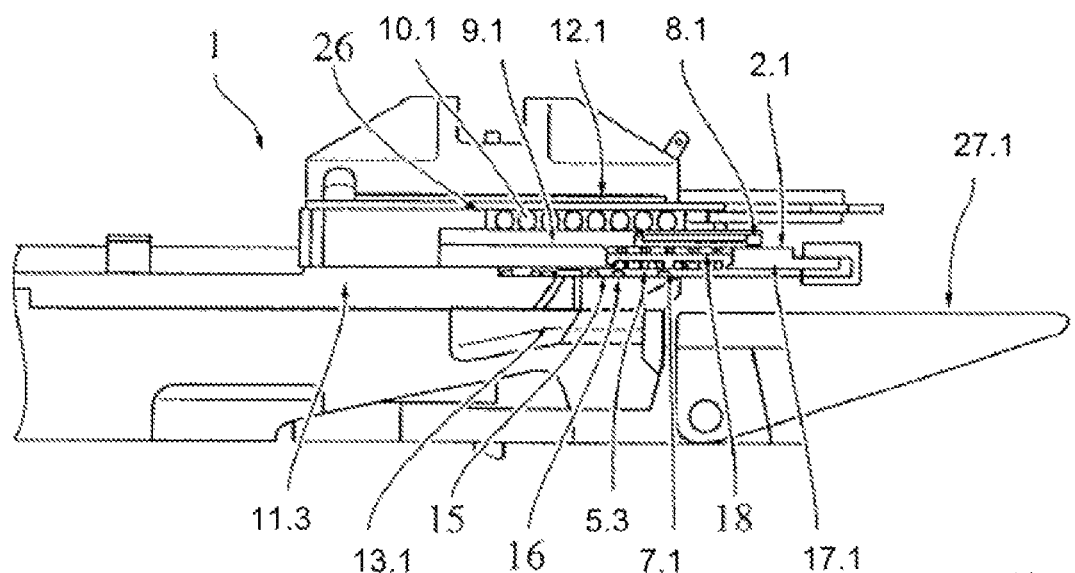
FIG. 14 shows a first embodiment of the food forming apparatus.

FIG. 14 shows a first embodiment of an inventive food forming apparatus. This food forming apparatus comprises a top plate 12.1 and a bottom plate 11.3, which are stationary parts of the inventive apparatus, i.e. its frame. These plates 11.3, 12.1 confine a gap in which a mould plate 17.1 is located. The mould plate 17.1 reciprocates between a filling position and a discharge position. The mould plate 17.1 comprises a frame 2.1 which is preferably made from a solid material. Furthermore, the mould plate 17.1 comprises a porous mould region 7.1, which is made from a porous material for example from a sintered material. In this porous mould region 7.1, cavities 5.3 have been machine-cut. The porous mould region 7.1 preferably comprises an array of cavities 5.3, i.e. the cavities 5.3 arranged in several rows whereas each row comprises a multitude of cavities 5.3. Each row extends preferably perpendicular to the direction of motion. The cavities 5.3 of the each rows are preferably emptied and filled simultaneously. The cavities 5.3 of two or more rows can also be emptied and filled simultaneously. Adjacent to the top surface of a mould plate 17.1 the inventive food product forming apparatus 3 comprises a locking plate 9.1. The locking plate 9.1 protects the mould plate 17.1 from above, for example against indentations from the rollers. Between the locking plate 9.1 and the top plate 12.1 a multitude of rolling elements 10.1 are arranged. These rolling elements 10.1 extend preferably over the entire width W (please compare FIG. 16) of the mould plate 17.1. In the present case, the rolling elements 10.1 are cylinders with a small diameter, app. 20 mm. These cylinders are arranged side by side with a very small distance in between. In the present case, the pitch is 25 mm, so that the distance between the rollers is 5 mm. This preferred embodiment of the present invention assures an equal pressure distribution in the mould plate 17.1 and no or little bending of the mould plate 17.1. The rolling elements 10.1 assure, that there is little friction between the mould plate 17.1 and the frame 2.1 of the food forming apparatus, i.e. the stationary top plate 12.1 during its motion between the two positions. Furthermore, the inventive patty machine comprises an inlet 13.1, through which the patty material is inserted preferably pumped into the cavities 5.3. This inlet is located in a filling station 6.1 which itself is located in the filling position 3.1.

Furthermore, the inventive food forming machine comprises a discharge position 4.1, in which the formed patties 22.1 are discharged from the mould plate 17.1 for example onto a belt 27.1. In the present case pressurized air, which is forced through the porous material, is used to eject the formed patties 22.1. The food forming apparatus therefore comprises in its discharge position 4.1 a discharge station 8.1, in the present case, means to force air through the porous region, especially through the cavities 5.3 more specifically through the bottom and through the sidewalls of the cavity 5.3.

Figure 15:
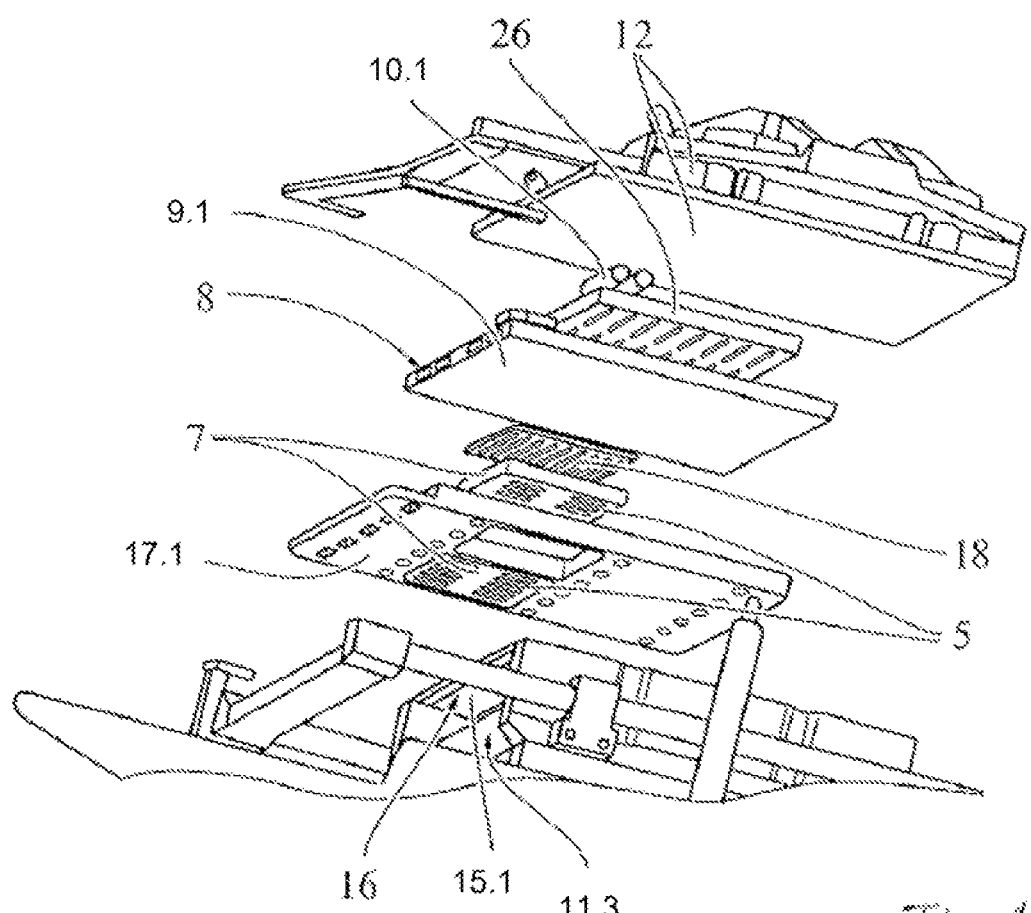
FIG. 15 shows a second embodiment of the food forming apparatus.

FIG. 15 shows a second embodiment of an inventive food forming machine. In comparison to the food forming machine according to FIG. 14, the present food forming machine additionally comprises a seal plate 15.1, which is located between the bottom plate 11.3 and the bottom surface of the mould plate 17.1. The seal plate 15.1 is pressed against the mould plate 17.1 by spring elements 16, preferably adjustable spring elements 16. This pressure force also presses the mould plate 17.1 against the locking plate 9.1 and the locking plate 9.1 against the rolling elements 10.1. The seal plate 15.1 seals the area around the inlet and assures that essentially all the food forming material is inserted into the cavities 26 and not around the cavities 26. Furthermore, the seal plate 15.1 cuts off material that stands beyond the cavities 26 of the mould plate.

Figure 16:
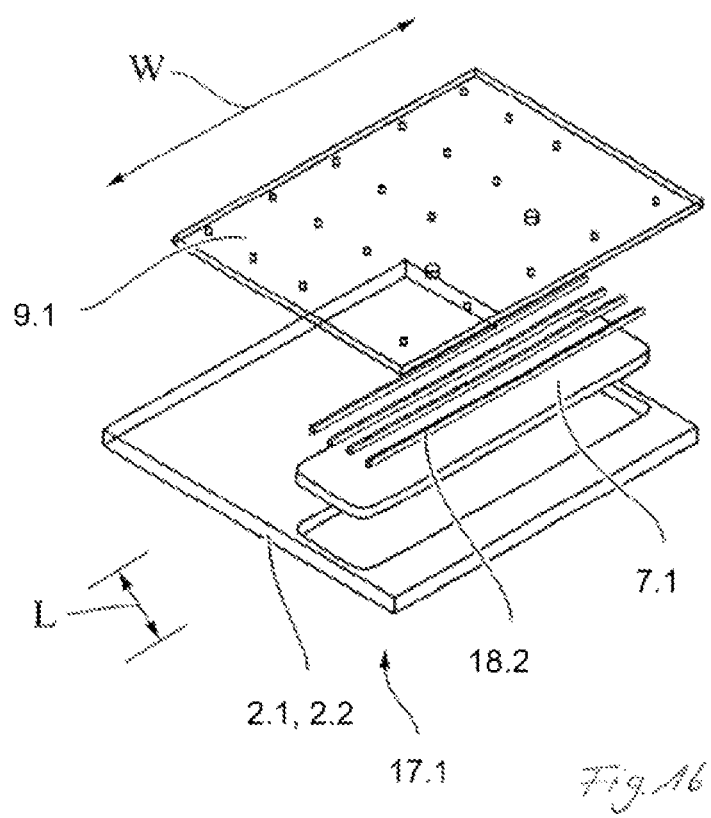
FIG. 16 shows a first embodiment of the mould plate.

FIG. 16 shows a first embodiment of the mould plate 17.1. In the present case, the porous mould region 7.1 is made from one piece, which is inserted for example pressed, screwed, welded, soldered or glued into the frame 2.1. The porous mould region 7.1 comprises at its lower surface a multitude of cavities, arranged in an array of a multitude of rows, each row comprising a multitude of cavities 5. In order to assure, that there is no air-shortcut regarding the air which is pressed into the porous insert to eject the patties, the inventive food forming machine comprises diverters 18.2 (in the present case four diverters), which are located in the gap between the locking plate 9.1 and the mould plate 2.2 and which also extend into the surface of the porous mould region 7.1.

Figure 17:
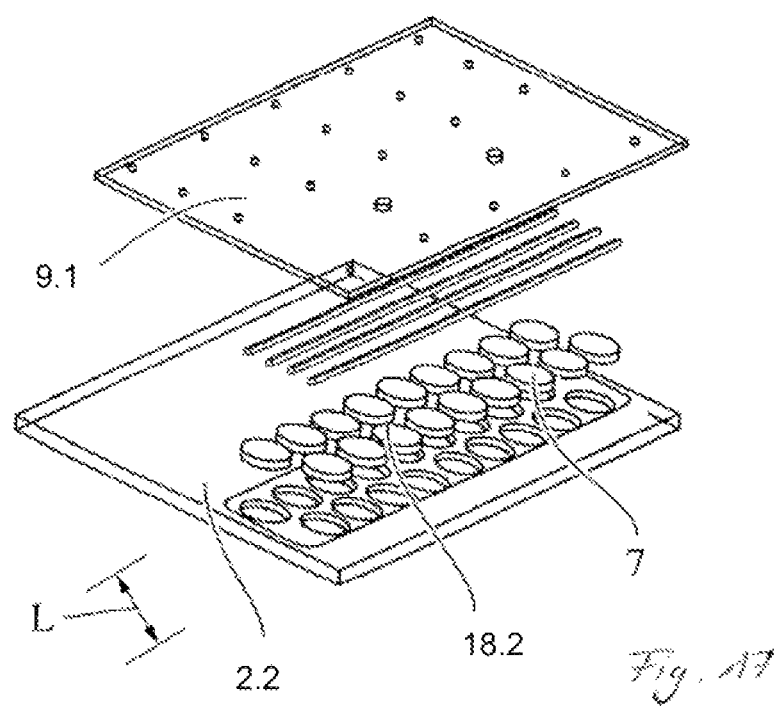
FIG. 17 shows a second embodiment of the mould plate.
Figure 21:
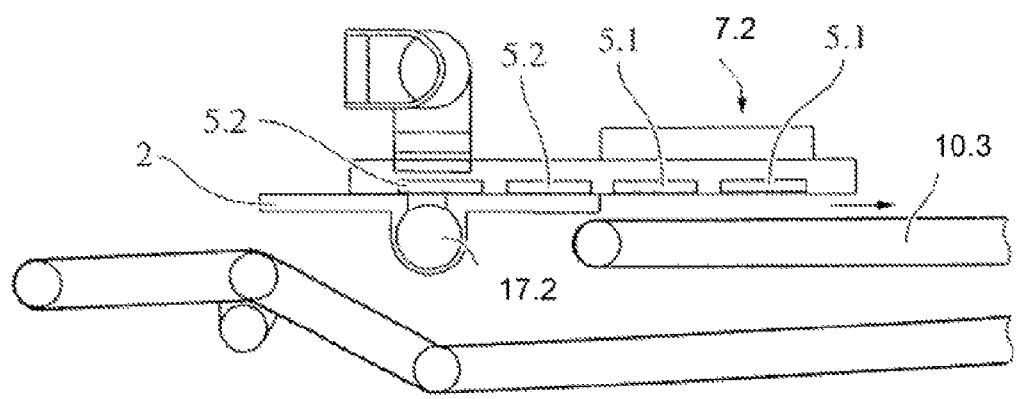

FIG. 17 shows another embodiment of the mould plate. In the present case, the porous elements are discrete elements, which are inserted into holes in the mould plate. One cavity comprises one individual porous element. Other than that, it is referred to the explanations according to FIG. 16.

FIG. 18 shows the operation of the inventive food forming apparatus. In FIG. 18 a, the cavities 5.3 are in the discharge position 4.1. In this discharge position 4.1, air is forced via an inlet into the cavities 5.3, especially into the porous mould region 7.1. The air flows through the porous mould region 7.1 into the cavities 5.3 and ejects the patties as depicted by arrow 20.1. The formed patties 22.1 preferably fall on a transportation belt 21 and are transported their way. As soon as the patties 22.1 have been discharged from the mould plate, the mould plate moves to the left as depicted by arrow 20.4 in FIG. 18 b. During the ingoing stroke and after the mould plate has reached its filling position 3.1 (FIG. 18 c), food forming material is inserted into the cavities 5.3, preferably pressed into the cavities of the mould plate 17.1, which is depicted by arrow 20.5. The porous material can be used during this step to remove entrapped air from the cavities.

As depicted in FIG. 18 d, the mould plate is moved back to its discharge position 4.1, as soon as the filling of the cavities is completed, and then again air is forced through ejection medium supply 8.1, to remove the formed patties 22.1 out of the mould plate as can be seen in FIG. 18 e.

FIG. 19 shows the inventive food forming apparatus, which comprises a mold plate 2.2 with a multitude of cavities 5.3. In the present example, the mold plate 2.2 comprises four rows of cavities 5.3, whereas each row comprises a multitude of cavities 5.3. The rows are oriented perpendicular to the motion of the mold plate 2.2. The motion of the mold plate 2.2 is depicted by the double arrow. Furthermore, the inventive food forming apparatus comprises one filling station 6.1 in which the patty material is pressed into one or more rows of cavities 5.3 simultaneously. In the present example, two rows of cavities 5.3 are filled simultaneously. Furthermore, the inventive food forming apparatus comprises a first discharge station 8.2 and a second discharge station 7.2. In the embodiment according to FIG. 19 two rows of cavities are presently emptied 5.1 in the second discharge station 7.2, while simultaneously two rows of cavities are filled 5.2 with the food forming material in the filling station 6.1. As can be seen from FIG. 19, each discharge station 7.2, 8.2 comprises its own belt 9.2, 10.3, whereas the first discharge station 8.2 is adjacent to belt. 10.2 and the second discharge station 7.2 is adjacent to belt 9.2. In FIG. 19 the formed patties are presently loaded on belt 9.2 and transported in a direction depicted by the arrow. Belt 9.2 preferably comprises three segments 9'-9''' whereas segments 9' and 9''' are movable relative to segment 9'', preferably the belt 9.2 comprises two axis 18.3, 19.3, whereas segment 9''' can turn around axis 18.3 relative to segment 9'' and segment 9' can turn relative to segment 9'' around axis 19.3. Furthermore, belt 9.2 comprises means 11.4, for example motor means, which can lower and lift belt 9.2 especially its segments 9', 9'''.

Figure 22:
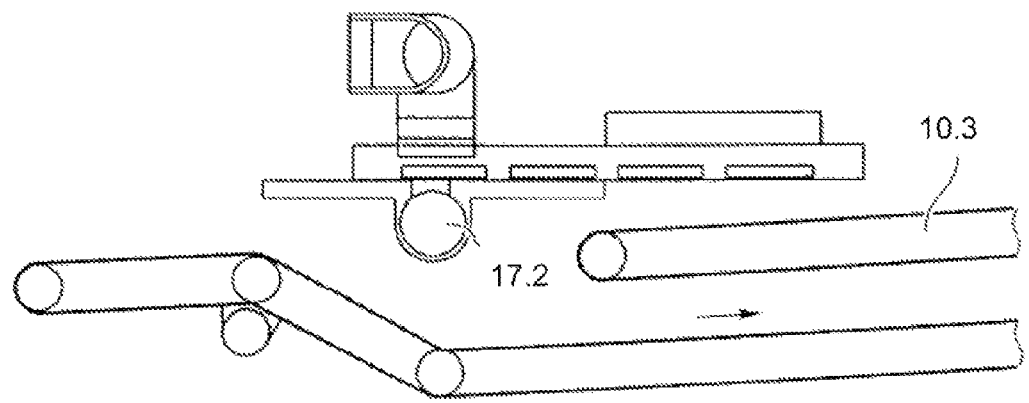

FIG. 20 shows the situation after the patties (not depicted) have been dropped on segment 9' of belt 9.2. Afterwards, this belt is lowered to avoid a collision of the patties especially with the means of the filling station 6.1. The patties are transported from the left to the right as depicted by the arrow. Simultaneously or sequentially, mold plate 2.2 is moved into its second position (please compare FIG. 20) in which the cavities which have just been emptied are now filled with patty material in the filling station. The cavities which have been filled in the previous step have now been aligned with the second discharge station 7.2. In this discharge station 7.2 air is ejected in order to eject the formed patties (not depicted) on belt 10.3. Subsequently, as can be seen in FIG. 22 belt 10.3 is tilted and thereby lowered in order to avoid a collision between the patties on the belt and the food forming apparatus. Afterwards as can be seen from FIG. 23 the mold plate 9 is moved back into the position as already depicted in FIG. 19 and the process restarts.

As can be seen from FIGS. 19-23, the outlet of the filling station 13.2, which is in the present case designed as a plate, has a width so that four rows of cavities can be filled simultaneously. Additionally, the outlet comprises a divider 17.2, for example a valve, that assures, that the patty material is only ejected through the segment of outlet plate that is covered by the mold-plate.

Figure 26:
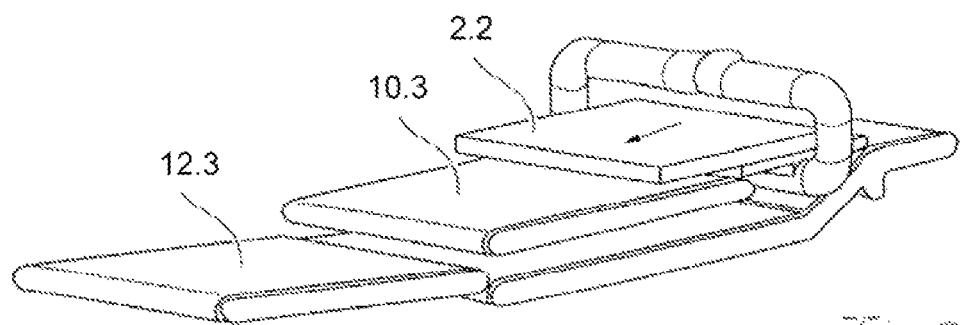
Figure 27:
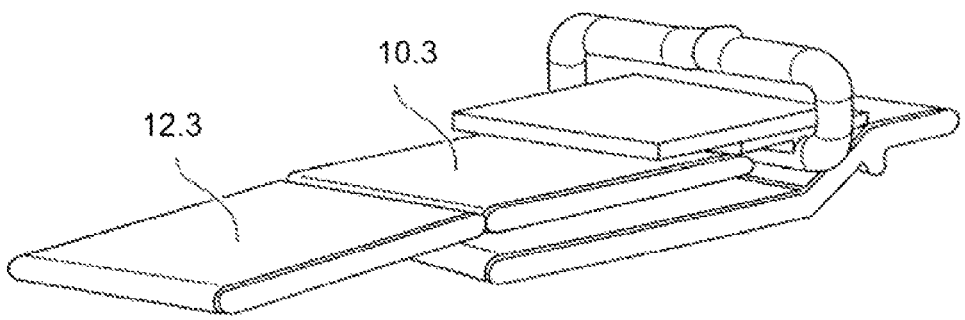
Figure 28:
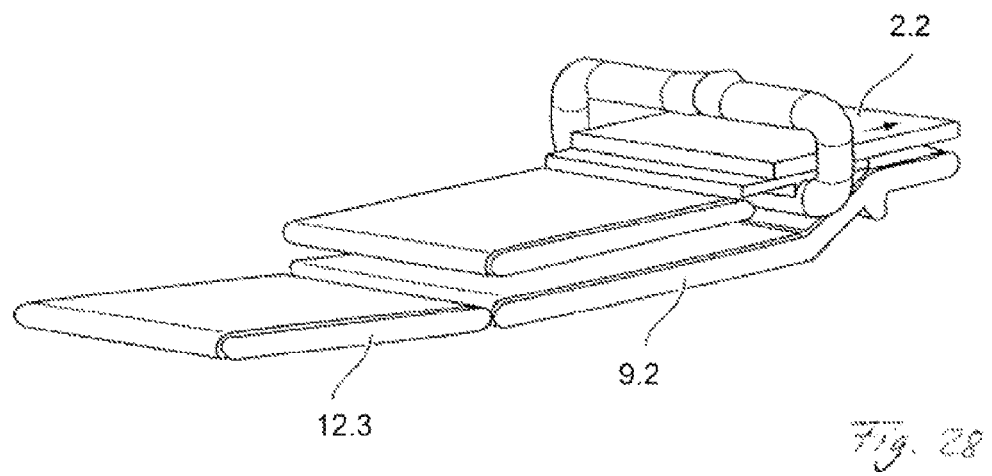
Figure 29:
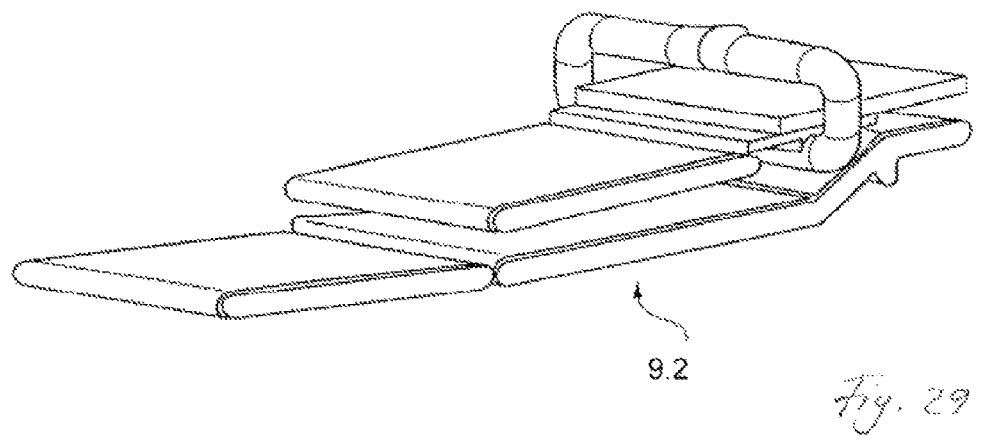

FIGS. 24-29 show a second embodiment of the present invention, which is essentially identical to the embodiment according to FIGS. 19-23 so that the disclosure regarding FIGS. 19-23 also applies to this embodiment. In this embodiment, the belt 9.2 is made from one segment and is tilted in order to increase the space between the belt 9.2 and the filling station 6.1 especially the distance between segment 9' and filling the filling station 16.2. Additionally, this embodiment of the present invention comprises a seesaw 12.3, which can be aligned either with belt 9.2 or with belt 10.3. In FIG. 24 the patties are loaded on belt 9.2. Thus, the seesaw 12.3 is aligned with this belt 9.2. Then, as can be seen in FIG. 26, the mold plate 2.2 is moved into its second position in which the mold cavities are emptied on belt 10.3. During this movement or afterwards, the seesaw 12.3 is tilted so that it is aligned with belt 10.3, as can be seen in FIG. 27. Then, as depicted in FIGS. 28 and 29, the mold plate 2.2 is moved back into its initial position (please compare FIG. 24) and the seesaw is again aligned with belt 9.2. Due to the seesaw, the loads of the belts 9.2 and 10.3 can be combined on one belt. The seesaw 12.3 or a belt that is downstream of the seesaw can be operated at a different speed than the seesaw itself or belts 9.2 and 10.3 in order to increase or decrease the distance between two rows.

Figure 30:
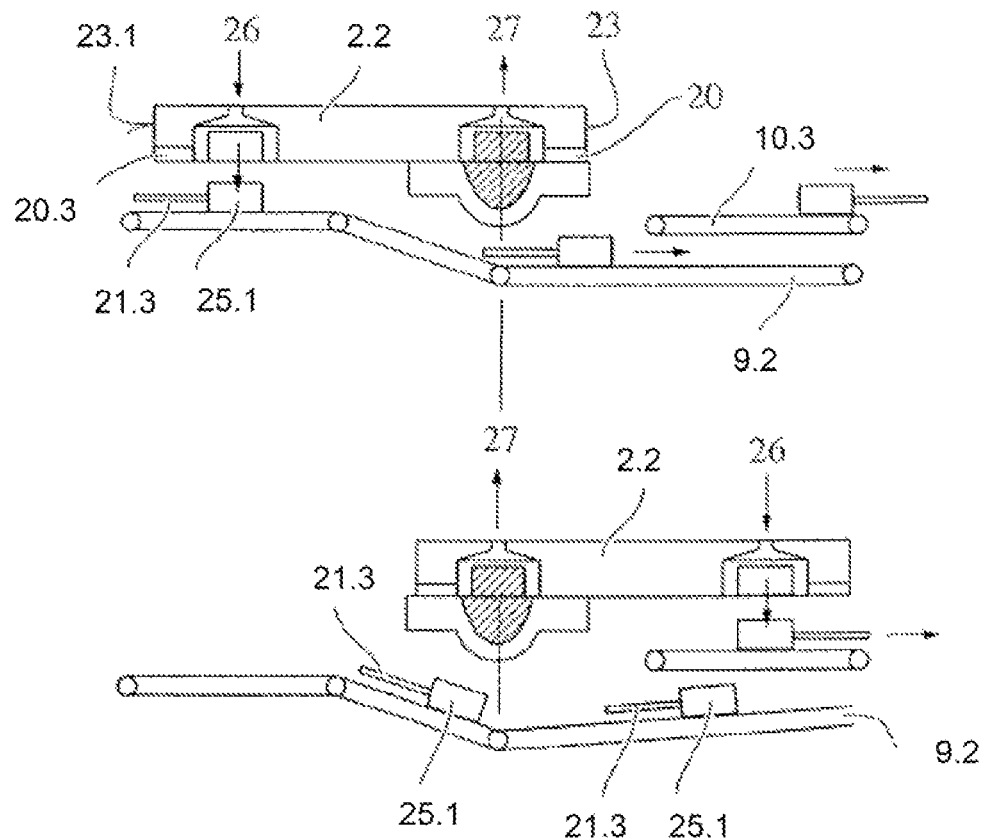
FIG. 30 shows the forming of patties with a stick.

FIG. 30 shows yet another embodiment of the present invention. In the present case, sticks 21.3 are inserted into the patties 25.1 after and/or while the patties 25.1 are formed. The mold plates 2.2 therefore comprise one slot 20.3 per cavity, which guides the stick 21.3 during its insertion into the patty 25.1. The stick 21.3 can be inserted into the patty 25.1 by moving the stick 21.3 and/or by moving the mold plate 2.2. The slots 20.3 are open towards the bottom and extend from the cavity towards the side limit 23.1 of the mold plate 2.2 that is perpendicular to the motion of the mold plate 2.2 which is depicted by the double arrow. Due to the opening of the slot 20.3 towards the bottom, the patty 25.1 plus the stick 21.3 can be easily deformed from the cavity of the mold plate 2.2. Due to the direction of the slot 20.3 in the mold plate 2.2, patties 25.1 are formed whose stick 21.3 points in the direction of the motion of the belt (patties on belt 10.3) and whose stick 21.3 is directed opposite of the motion of the belt (patties on transportation belt 9.2).

Figure 31:
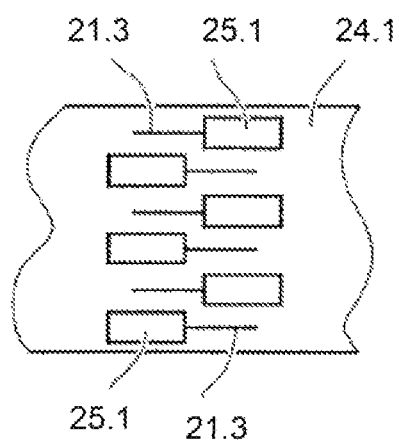
FIG. 31 shows a belt loaded with staggered patties.
Figure 22:
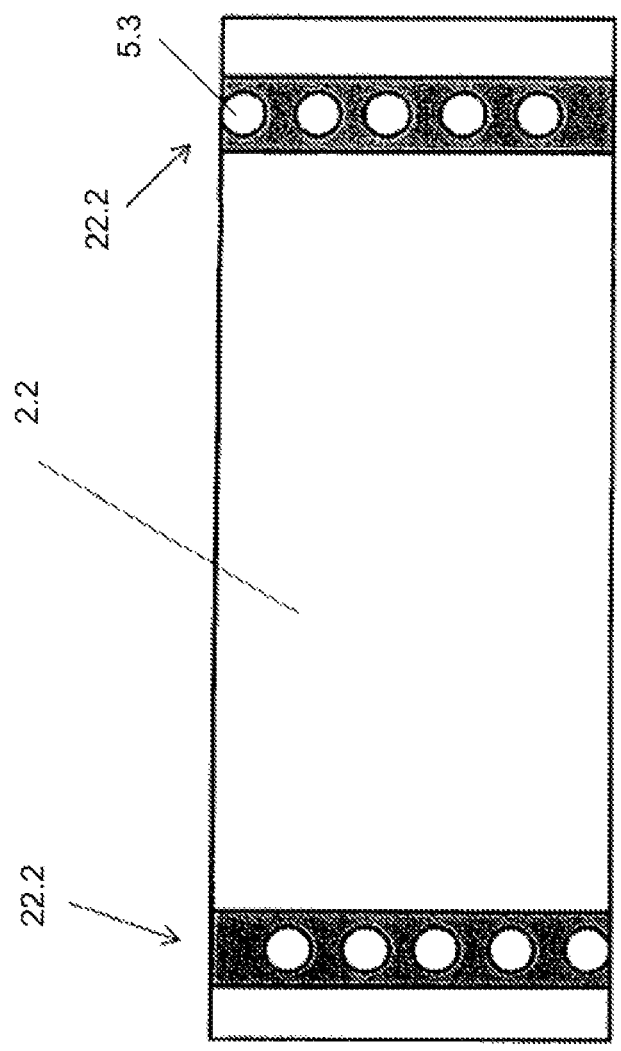

By means of for example a seesaw 12.3 as depicted in FIGS. 24-29, a pattern as depicted in FIG. 31 can be created. The person skilled in the art understands that this pattern also requires that belt 9.2, belt 10.3, the sea saw 12.3 and/or belt 24.1 downstream of belt 9.2 and 10.3 and/or the seesaw 12.3 have to be movable sideward, i.e. horizontally and perpendicularly to the direction of motion of the belt and/or a motion with such a component. The pattern according to FIG. 31 has the advantage, that the patty load per unit area of a belt can be increased which is advantageous for further processing of the patties and/or the packaging of the patties because a relatively smaller package is needed. The person skilled in the art understands, that this is also true for patties without a stick.

Staggered patties as depicted in FIG. 31 can also be achieved by arranging the cavities in the mold plate 2.2 in a staggered mode, as depicted in FIG. 32. With such a mold plate, the sideward motion of one of the belts and/or the seesaw is not needed.

LIST OF REFERENCE SIGNS 1 form member, 1.1 mould plate, 1.2 drum, food forming apparatus 2 de-aeration member, 2.1 frame, 2.2 mould plate
3 food product forming apparatus, 3.1 filling position
4 housing, 4.1 discharge position
5 base member, 5.3 cavities
5.1 cavities being emptied
5.2 cavities being filled
6 lateral guides, 6.1 filling station
7 closure member, 7.1 porous mould region, 7.2 second discharge station
8 ventilation holes, 8.1 ejection medium supply. 8.2 first discharge station
9 chamber, 9.1 locking plate, 9.2 belt
9'-9''' segments of the belt
10 feed opening, 10.1 rolling element, zylinder, 10.3 belt
11 mould, insert, plate, 11.3 bottom plate, 11.4 means
12 recess, 12.1 top plate, top plate, 12.3 seesaw
13 pressure member, inlet, 13.2 outlet of the filling station
14 opening, outlet, first outlet means
15 groove, 15.1 seal plate, second outlet means
16 spring element, spring element, 16.2 filling of the filling station
17 groove, 17.1 mould plate, 17.2 divider
18 spring element, 18.2 divider, 18.3 axis
19 knock out cup, ejection medium, air, 19.3 axis
20 permeable bottom, 20.1 arrow, dropping patty, 20.3 slot, 20.4 arrow, 20.5 arrow
21 transportation belt, patty-material supply, 21.3 stick
22 food product, 22.1 patty, 22.2 row of cavity
23 blade, 23.1 side limit
24 piston, belt
25 channel, 25.1 patty
26 cavity, roller cage, gas, air
27 indentation, 27.1 belt, vent
28 branch, patty transport
29 stick
30 opening, 30.1 slot
31 pressure transfer means, 31.1 lamellas
32 ejector
33 food mass
34 stick insertion unit
35 insertion pin
36 front end
W width of the mould plate
L region, in which the cavities are arranged, porous mould region
38 convexity between adjacent moulds 11.
40 surface of the form member 1, drum 1.2

The invention claimed is:

1. A food product forming apparatus to produce patties with a form member which comprises:
   a plurality of moulds for forming the patties, the plurality of moulds are arranged in rings around a circumference of the form member, the plurality of moulds extend below a surface of the form member,
   a convexity extending above the surface of the form member between adjacent moulds in each of the rings allowing an extension of the patties beyond the surface of the form member,
   wherein the form member is at least partially made from a porous material, and is located adjacent to a pressure member, the pressure member is in contact with the surface of the form member between the rows,
   wherein the patties are removed from the plurality of moulds by ejecting a gas,
   wherein the form member is a rotating drum, and the pressure member is 3D-shaped and the surface of the form member, which interacts with the pressure member, is 3D-shaped and is configured to produce a respective patty that does not comprise a constant thickness over an entire extension thereof, and wherein the pressure member is in contact with the surface of the form member between adjacent rings and has an area corresponding to a respective convexity extending above the surface of the form member.

2. The food product forming apparatus according to claim 1, wherein the food product forming apparatus comprises an adjustable spring element between a base element and the pressure member.

3. The food product forming apparatus according to claim 1, wherein a blade is at least partially integrated in the pressure member, wherein the pressure member comprises an opening and the blade is located at a circumference of the opening.

4. The food product forming apparatus according to claim 1, wherein vacuum is applied to the form member to avoid unintentional release of the patty.

5. The food product forming apparatus according to claim 1, wherein water is applied to the form member after the patties have been released.

6. The food product forming apparatus according to claim 1, wherein several rows of patties are produced simultaneously.

7. The food product forming apparatus according to claim 1, wherein inserts are connected to an ambient, a pressure-medium-system, or both.

8. The food product forming apparatus according to claim 1, comprising, a stick insertion unit, wherein the stick insertion unit is movable, along at least a segment of a circular arc.

9. The food product forming apparatus according to claim 8, wherein the stick insertion unit is located at a front end of the drum.

10. The food product forming apparatus according to claim 8, the food product forming apparatus comprises a cam that pushes a stick into the patty, while the form member is advancing.

11. The food product forming apparatus according to claim 8, wherein the food product forming apparatus includes a slot through which a stick is inserted into the patty.

12. The food product forming apparatus according to claim 1, wherein at an edge of the form member, at least one mould is open at the edge, and a food mass in the at least one mould that is open is confined therein by the pressure member.

13. The food product forming apparatus according to claim 1, wherein the form member has a substantially circular cross section.

14. The food product forming apparatus according to claim 1, wherein the pressure member is stationary while the product is formed.

15. The food product forming apparatus according to claim 1, wherein a food mass is added to the moulds while the pressure member is in contact with the surface of the form member.

16. A food product forming apparatus to produce patties with a form member, the form member comprising:

a plurality of moulds for forming the patties, the plurality of moulds are generally arranged in an end-to-end arrangement in rings around a circumference of the form member, the plurality of moulds extend into a surface of the form member;

a convexity extending above the surface of the form member between adjacent ends of adjacent moulds in each of the rings, an edge where at least one mould is open at the edge, wherein the form member is at least partially made from a porous material and is located adjacent to a pressure member, the pressure member is in contact with the surface of the form member, wherein a food mass that is located in the at least one mould that is open at the edge is confined therein by the pressure member, wherein the patties are removed from the plurality of moulds by ejecting a gas, wherein the form member is a rotating drum, and the pressure member is 3D-shaped and the surface of the form member, which interacts with the pressure member, is 3D-shaped and is configured to produce a respective patty that does not comprise a constant thickness over an entire extension thereof, and wherein the pressure member is in contact with the surface of the form member between adjacent rings and has an area corresponding to a respective convexity extending above the surface of the form member.

17. The food product forming apparatus according to claim 16, wherein the food mass is added to the moulds while the pressure member is in contact with the surface of the form member.

18. A food product forming apparatus to produce patties with a form member which comprises:

a plurality of moulds for forming the patties, the plurality of moulds are generally arranged end-to-end in rings extending around a circumference of the form member, each of the plurality of moulds extend below a surface of the form member;

a convexity extending above the surface of the form member between adjacent ends of the plurality of moulds so that an extension of the patties can extend beyond the surface of the form member, at least one edge where at least one mould is open at the at the least one edge, wherein the form member is located adjacent to a stationary pressure member, the at least one mould that is open at the at least one edge is confined at a form plate edge of the form plate by the pressure member, wherein the pressure member is in contact with the surface of the form member between adjacent rings and has an area corresponding to a respective convexity extending above the surface of the form member wherein the patties are removed from the plurality of moulds by ejecting a gas, wherein the form member is a cylindrical rotating drum and the pressure member is 3D-shaped and the surface of the form member, which contacts the pressure member, is 3D-shaped, so that a respective patty is formed that does not comprise a constant thickness over an entire extension thereof.

19. The food product forming apparatus according to claim 18, wherein the food product forming apparatus includes lamellas extending between a base member and the pressure member, wherein the lamellas transfer pressure from the base member to the pressure member so that the surface of the form member contacts the pressure member while the product is formed.

20. The food product forming apparatus according to claim 18, wherein a food mass is added to the moulds while the pressure member is in contact with the surface of the form member.

* * * * *